United States Patent
Kelpe et al.

(10) Patent No.: US 12,352,152 B2
(45) Date of Patent: Jul. 8, 2025

(54) HORIZONTAL DIRECTIONAL DRILLING SYSTEM AND METHOD

(71) Applicant: Vermeer Manufacturing Company, Pella, IA (US)

(72) Inventors: Hans Frederick Kelpe, Pella, IA (US); Alan Wilson-Langman, Pleasant Hill, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 18/436,842

(22) Filed: Feb. 8, 2024

(65) Prior Publication Data

US 2024/0175347 A1  May 30, 2024

Related U.S. Application Data

(63) Continuation of application No. 17/949,389, filed on Sep. 21, 2022, now Pat. No. 11,927,090, which is a
(Continued)

(51) Int. Cl.
E21B 47/13 (2012.01)
E21B 7/04 (2006.01)
E21B 47/002 (2012.01)

(52) U.S. Cl.
CPC ............ *E21B 47/002* (2020.05); *E21B 7/046* (2013.01); *E21B 47/13* (2020.05)

(58) Field of Classification Search
CPC ......... E21B 47/002; E21B 47/13; E21B 7/046
See application file for complete search history.

(56) References Cited

U.S. PATENT DOCUMENTS 2,009,004 A   7/1935  Schatzel
3,268,965 A   8/1966  Arthur
(Continued)

FOREIGN PATENT DOCUMENTS

CN   2560977 Y   7/2003
EP   0264511 A1  4/1988
(Continued)

OTHER PUBLICATIONS

Amstutz, Jay, "Ridgid CrossChek Inspection System-Utility Bore Slot Drilling," Cop Tool Website, Apr. 24, 2012, pp. 1-3, Ohio Power Tool. Ohio, USA. http://www.coptool.com/ridgid-crossche••inspection-system-utility-bore-slot-drilling/.
(Continued)

*Primary Examiner* — Taras P Bemko
(74) *Attorney, Agent, or Firm* — Michael Best & Friedrich LLP

(57) ABSTRACT

An adapter assembly for connection between a drill head of a horizontal directional drilling system and a utility line. A central housing body defines an interior space. A first end cap is secured to a first end of the central housing body. A second end cap is secured to a second end of the central housing body and configured to attach to the utility line. An electromagnetic (EM) sensor, including an antenna arrangement is configured to emit and receive EM signals, provided within the interior space of the central housing body. A connection structure at the first end cap is configured to attach to the drill head for pullback. The central housing body is at least partially transmissive to the EM signals, and the EM sensor is configured to receive electrical power and transmit data via wiring connected through at least one of the first and second end caps.

20 Claims, 15 Drawing Sheets

Related U.S. Application Data continuation of application No. 17/155,793, filed on Jan. 22, 2021, now Pat. No. 11,473,418.

(60) Provisional application No. 62/964,267, filed on Jan. 22, 2020.

(56) References Cited

U.S. PATENT DOCUMENTS

| | | |
|---|---|---|
| 3,680,461 A | 8/1972 | Amesbury et al. |
| 4,331,975 A | 5/1982 | Krawza et al. |
| 4,362,413 A | 12/1982 | Heard et al. |
| 4,510,611 A | 4/1985 | Dougherty |
| 4,578,675 A | 3/1986 | MacLeod |
| 4,767,237 A | 8/1988 | Cosman et al. |
| 4,862,550 A | 9/1989 | Batchelor |
| 4,884,847 A | 12/1989 | Bessinger et al. |
| 4,921,374 A | 5/1990 | Stutzman |
| 4,926,158 A | 5/1990 | Zeigler |
| 5,025,868 A | 6/1991 | Wentworth et al. |
| 5,133,417 A | 7/1992 | Rider |
| 5,134,471 A | 7/1992 | Gendron et al. |
| 5,163,521 A | 11/1992 | Pustanyk et al. |
| 5,276,949 A | 1/1994 | Cordellini |
| 5,457,995 A | 10/1995 | Staton et al. |
| 5,614,811 A | 3/1997 | Sagalovich et al. |
| 5,652,617 A | 7/1997 | Barbour |
| 5,698,981 A | 12/1997 | Mercer |
| 5,720,354 A | 2/1998 | Stump et al. |
| 5,725,061 A | 3/1998 | Van Steenwyk et al. |
| 5,828,293 A | 10/1998 | Rickard |
| 5,904,210 A | 5/1999 | Stump et al. |
| 5,961,252 A | 10/1999 | Mercer et al. |
| 5,986,539 A | 11/1999 | Johansson et al. |
| 6,035,951 A | 3/2000 | Mercer et al. |
| 6,037,678 A | 3/2000 | Rickard |
| 6,041,860 A | 3/2000 | Nazzal et al. |
| 6,041,960 A | 3/2000 | Leal |
| 6,079,506 A | 6/2000 | Mercer |
| 6,115,061 A | 9/2000 | Lieberman et al. |
| 6,160,401 A | 12/2000 | Mercer |
| 6,161,625 A | 12/2000 | Mati |
| 6,191,585 B1 | 2/2001 | Mercer et al. |
| 6,279,668 B1 | 8/2001 | Mercer |
| 6,285,190 B1 | 9/2001 | Brune et al. |
| 6,308,787 B1 | 10/2001 | Alft |
| 6,313,755 B1 | 11/2001 | Hetmaniak |
| 6,315,062 B1 | 11/2001 | Alft |
| 6,408,952 B1 | 6/2002 | Brand et al. |
| 6,467,554 B1 | 10/2002 | Millican |
| 6,496,008 B1 | 12/2002 | Brune et al. |
| 6,559,757 B1 | 5/2003 | Deller et al. |
| 6,580,449 B1 | 6/2003 | Meltzer |
| 6,614,354 B2 | 9/2003 | Haines et al. |
| 6,651,755 B1 | 11/2003 | Kelpe |
| 6,679,120 B1 | 1/2004 | Cribbs et al. |
| 6,719,069 B2 | 4/2004 | Alft et al. |
| 6,833,795 B1 | 12/2004 | Johnson et al. |
| 6,868,921 B2 | 3/2005 | Burrows et al. |
| 6,899,178 B2 | 5/2005 | Tubel |
| 6,904,981 B2 | 6/2005 | Van Riet |
| 6,910,541 B2 | 6/2005 | Kelpe |
| 6,935,439 B2 | 8/2005 | Mercer et al. |
| 7,011,166 B2 | 3/2006 | Koch et al. |
| 7,026,917 B2 | 4/2006 | Berkman |
| 7,064,676 B2 | 6/2006 | Hall et al. |
| 7,086,808 B2 | 8/2006 | Wentworth et al. |
| 7,225,885 B2 | 6/2007 | Mercer |
| 7,367,748 B2 | 5/2008 | Groebner et al. |
| 7,425,829 B2 | 9/2008 | Zeller et al. |
| 7,534,995 B2 | 5/2009 | Peters et al. |
| 7,552,631 B2 | 6/2009 | Harthorn et al. |
| 7,607,494 B2 | 10/2009 | Alft et al. |
| 7,715,701 B2 | 5/2010 | Lange |
| 7,737,863 B2 | 6/2010 | Jin et al. |
| 7,751,038 B2 | 7/2010 | Vessereau et al. |
| 7,926,589 B2 | 4/2011 | Mercer |
| 7,930,103 B2 | 4/2011 | Young et al. |
| 7,931,097 B2 | 4/2011 | Cartwright |
| 7,932,469 B1 | 4/2011 | Shelton et al. |
| 8,169,477 B2 | 5/2012 | Tawfiq et al. |
| 8,220,564 B2 | 7/2012 | Runquist et al. |
| 8,353,365 B2 | 1/2013 | Mercer |
| 8,381,836 B2 | 2/2013 | Brune et al. |
| 8,988,969 B2 | 3/2015 | Wallbom et al. |
| 8,997,890 B2 | 4/2015 | Mercer et al. |
| 9,054,504 B2 | 6/2015 | Shelton et al. |
| 9,388,683 B2 | 7/2016 | Mercer |
| 9,399,910 B2 | 7/2016 | Sooy et al. |
| 9,651,711 B1 | 5/2017 | Olsson et al. |
| 9,664,027 B2 | 5/2017 | Chau et al. |
| 9,708,902 B2 | 7/2017 | Lopez Rodriquez |
| 9,765,609 B2 | 9/2017 | Chemali et al. |
| 9,810,053 B2 | 11/2017 | Mercer |
| 9,932,814 B2 | 4/2018 | Harris et al. |
| 10,103,780 B1 | 10/2018 | Laifenfeld et al. |
| 10,171,721 B2 | 1/2019 | Olsson et al. |
| 10,181,365 B2 | 1/2019 | Shelton et al. |
| 2001/0024597 A1 | 9/2001 | Turner et al. |
| 2001/0052426 A1 | 12/2001 | Mercer |
| 2002/0020561 A1 | 2/2002 | Alft et al. |
| 2002/0075114 A1 | 6/2002 | Hall et al. |
| 2002/0105331 A1 | 8/2002 | Brune et al. |
| 2002/0162406 A1 | 11/2002 | Wentwort et al. |
| 2003/0111268 A1 | 6/2003 | Alft et al. |
| 2004/0028476 A1 | 2/2004 | Payne et al. |
| 2004/0163822 A1 | 8/2004 | Zhang et al. |
| 2005/0061547 A1 | 3/2005 | Wilson-Langman et al. |
| 2005/0082091 A1 | 4/2005 | Kingsley |
| 2005/0199424 A1 | 9/2005 | Stump |
| 2005/0236186 A1 | 10/2005 | Mercer |
| 2005/0285753 A1 | 12/2005 | Shah et al. |
| 2006/0001549 A1 | 1/2006 | Shah et al. |
| 2006/0161351 A1 | 7/2006 | Nickel et al. |
| 2007/0007006 A1 | 1/2007 | Massingill et al. |
| 2007/0029112 A1 | 2/2007 | Li et al. |
| 2007/0104541 A1 | 5/2007 | Groebner et al. |
| 2007/0193777 A1 | 8/2007 | Mercer |
| 2007/0297778 A1 | 12/2007 | Lange |
| 2010/0012377 A1 | 1/2010 | Sharp et al. |
| 2010/0013728 A1 | 1/2010 | Harak et al. |
| 2010/0059219 A1 | 3/2010 | Roberts et al. |
| 2010/0206580 A1 | 8/2010 | Tessari et al. |
| 2010/0224356 A1 | 9/2010 | Moore |
| 2010/0301866 A1 | 12/2010 | Blssum et al. |
| 2011/0162889 A1 | 7/2011 | Mercer |
| 2011/0254366 A1 | 10/2011 | Borchers |
| 2011/0264984 A1 | 10/2011 | Murakami |
| 2012/0006597 A1 | 1/2012 | Boike |
| 2012/0098675 A1 | 4/2012 | Volkel |
| 2012/0169841 A1 | 7/2012 | Chemali et al. |
| 2012/0241218 A1 | 9/2012 | Chau et al. |
| 2012/0292110 A1 | 11/2012 | Downton |
| 2013/0008723 A1 | 1/2013 | Hoelting et al. |
| 2013/0020130 A1 | 1/2013 | Trinh et al. |
| 2013/0025939 A1 | 1/2013 | Heliot et al. |
| 2013/0118810 A1 | 5/2013 | Mercer |
| 2013/0168078 A1 | 7/2013 | McCarter et al. |
| 2013/0176137 A1 | 7/2013 | Kolpack et al. |
| 2013/0176139 A1 | 7/2013 | Chau et al. |
| 2014/0022088 A1 | 1/2014 | Chau et al. |
| 2014/0152802 A1 | 6/2014 | Olsson et al. |
| 2014/0192180 A1 | 7/2014 | Sooy et al. |
| 2014/0201508 A1 | 7/2014 | Busaba et al. |
| 2014/0291023 A1 | 10/2014 | Edbury et al. |
| 2014/0375464 A1 | 12/2014 | Caragata |
| 2015/0201385 A1 | 7/2015 | Mercer et al. |
| 2015/0211356 A1 | 7/2015 | Mercer |
| 2015/0326279 A1 | 11/2015 | Schneider et al. |
| 2016/0265347 A1 | 9/2016 | Gunsaulis et al. |
| 2016/0298440 A1 | 10/2016 | Mercer |
| 2017/0046829 A1 | 2/2017 | Hovland et al. |
| 2017/0308493 A1 | 10/2017 | Kobayashi et al. |

(56) References Cited

U.S. PATENT DOCUMENTS

| | | | |
|---|---|---|---|
| 2018/0010419 A1 | 1/2018 | Livescu et al. | |
| 2018/0259676 A1 | 9/2018 | Dunn et al. | |

FOREIGN PATENT DOCUMENTS

| | | | |
|---|---|---|---|
| EP | 0360543 | B1 | 10/1994 |
| EP | 1021866 | B1 | 10/2002 |
| EP | 3446958 | A1 | 2/2019 |
| GB | 2500671 | A8 | 7/2014 |
| KR | 101692381 | B1 | 1/2017 |
| RU | 2100531 | C1 | 12/1997 |
| RU | 2175368 | C2 | 10/2001 |
| RU | 2004127944 | A | 5/2005 |
| WO | 0060777 | A1 | 10/2000 |
| WO | 0151760 | A2 | 7/2001 |
| WO | 2006134726 | A1 | 12/2006 |
| WO | 2017189796 | A1 | 11/2017 |
| WO | 2018049024 | A1 | 3/2018 |
| WO | 2018093273 | A1 | 5/2018 |

OTHER PUBLICATIONS

Ridgid, "CrossChek Inspection-Wet Clay," YouTube Video, Mar. 7, 2012, Ridge Tool Company, Ohio, USA. https://www.youtube.com/watch?v=pMa_7sZaqdU.

Ridgid, "Ridgid CrossChek Inspection System," User's Manual, Mar. 1, 2012, p. 1, Ridge Tool Company, Ohio, USA. https://cdn2.ridgid.com/resources /media?key=2cd8cace-eb32-40d4-8b23-46998dfe9b52&languageCode=en&cotmtryCode=US&type=document.

Staff Writer. "Ridgid CrossChek: Pipe Inspection Made Easy," Underground Focus Magazine, Jul. 31, 2012, pp. 1-3 http://underspace.com/ridgid-crosschek-pipe-inspection-made-easy/.

Empire Generating Co, "Horizontal Directional Drill Contingency Plan", Aug. 28, 2008, pp. 1-17, XP 055281407, Retrieved from the Internet: URL: http://documents.dps.ny.gov/public /Common / ViewDoc. aspx?DocRefId={84EDDA33-069A-4446-A5FE-12D5271926D5}.

Copperhead Industries, LLC, "Best Practices for Tracer Wire System Installation", website: http://www.kcc.state.ks.us/images/PDFs/pipeline/2017-seminar/Tracer_Wire_Best_Practices.pdf, Copyright 2017 (50 Pages).

Trace-Safe, "Water Blocking Tracer Wire", website: http://www.trace-safe.com/, Copyright 2020, (5 Pages).

Performance Wire & Cable Inc., "Horizontal Directional Drilling Wire", website: https://www.performancewire.com/product-type/horizontal-directional-drilling/, webpage accessed May 2021, (4 Pages).

LincEnergy Systems, "Tracer Wire for Horizontal Directional Drilling", website: https://www.lincenergysystems.com/gas-equipment/marking/pro-trace-directional-drilling-tracer-wire/, Copyright 2021, (2 Pages).

Kristech, "Kris-Tech Copper Wire products", website: http://www.kristechwire.com/product-spec-sheets/pe-tracer-wire/, Copyright 2021, (8 Pages).

Nassco, "CUES Releases New PICS Cross Bore Inspection Camera", website: https://www.nassco.org/news/cues-releases-new-pics-cross-bore-inspection-camera, Copyright 2021, (3 Pages).

Reina et al., "A Self-Learning Ground Classifier using Radar Features", Article in Springer Tracts in Advanced Robotics, Dec. 2014 (15 Pages).

NeuroHive, "Seeing Beyond Walls"—Human Pose Estimation Under Occlusions, website: https://medium.com/neurohive-computer-vision/seeing-beyond-walls-human-pose-estimation-under-occlusions-c87f2e0a6baa, Jun. 21, 2018, (7 Pages).

Copperhead Provided TraceGuide, "Utility Marking Trace Wire Guide", website: http://www.mrwa.com/PDF/Traceguide20143.pdf, Feb. 2014, (5 Pages).

EETimes, "What is Power Line Communication" website: https://www.eetimes.com/what-is-power-line-communication/#, Aug. 17, 2011, (6 Pages).

Digital Control Incorporated, "TensiTrak System", You Tube Video screenshots, https://www.youtube.com/watch?v=yQ7SYSRZUIY, Oct. 27, 2016, (6 Pages).

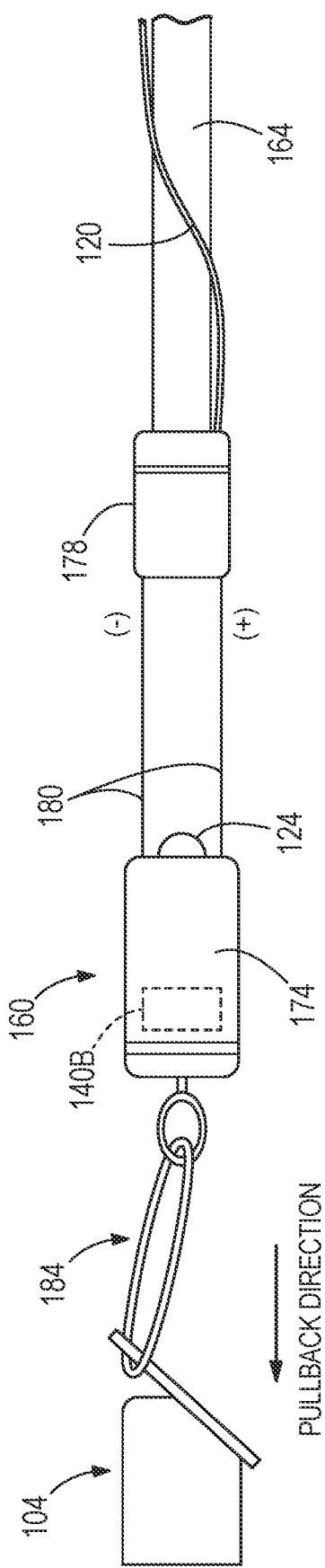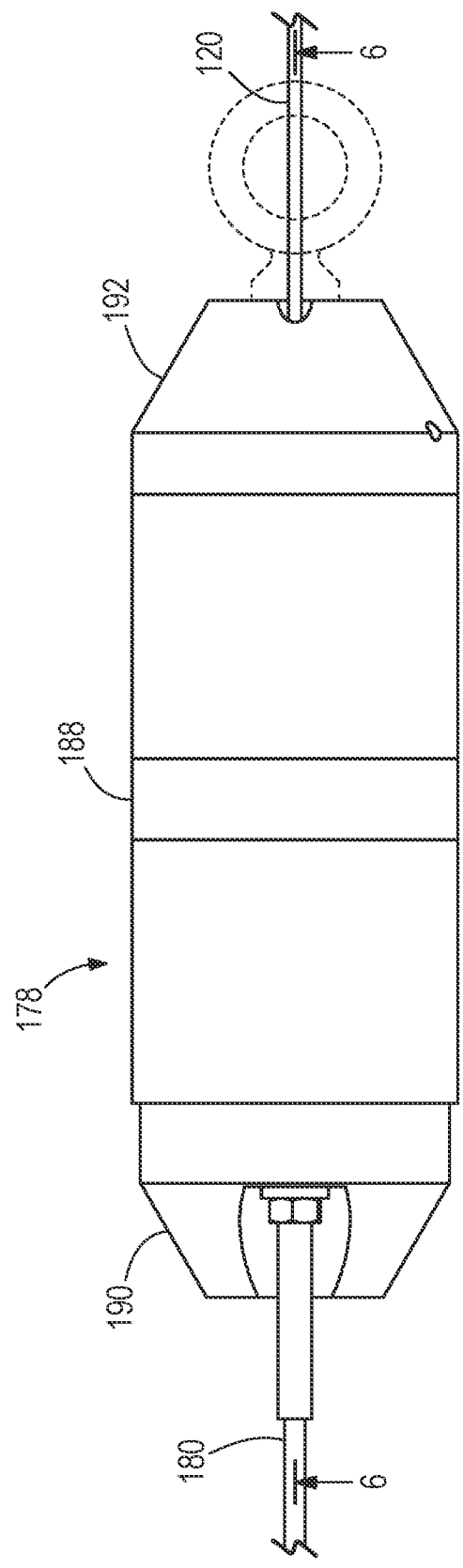
FIG. 4
FIG. 5

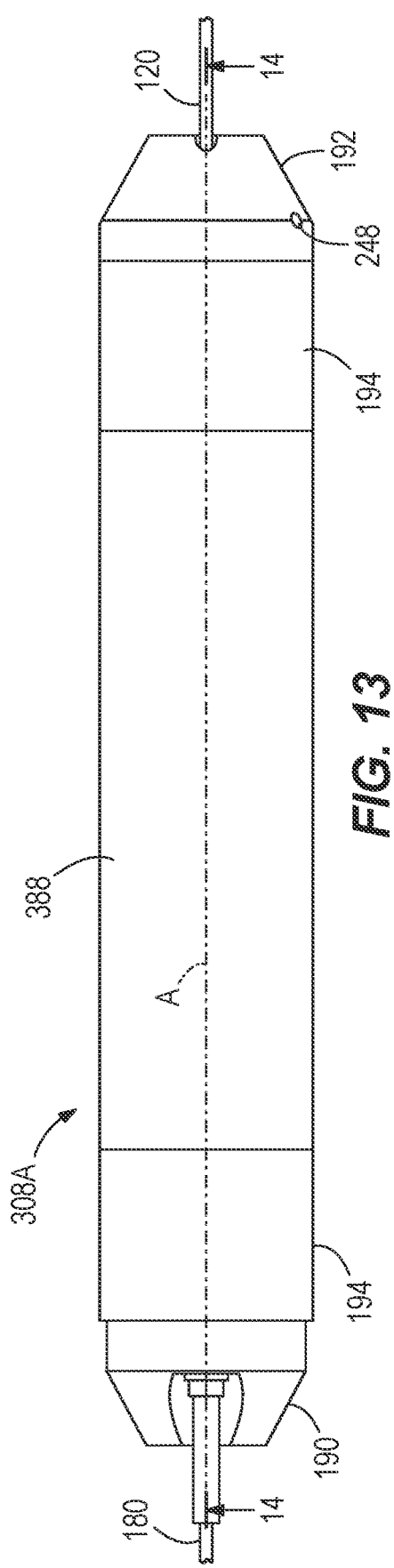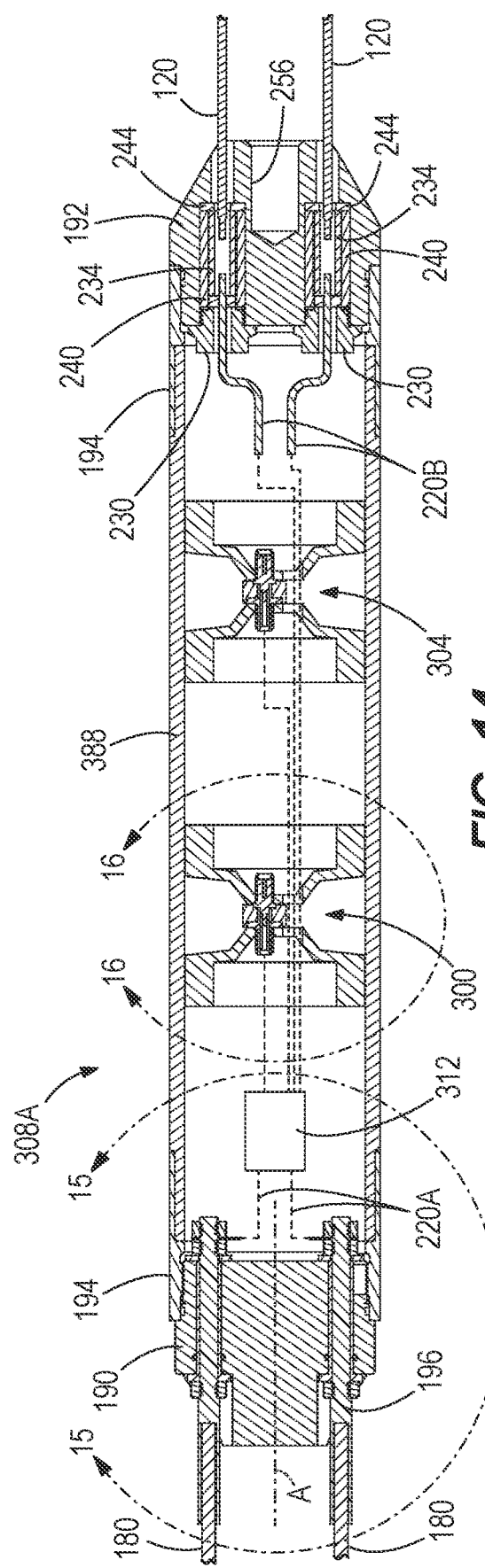

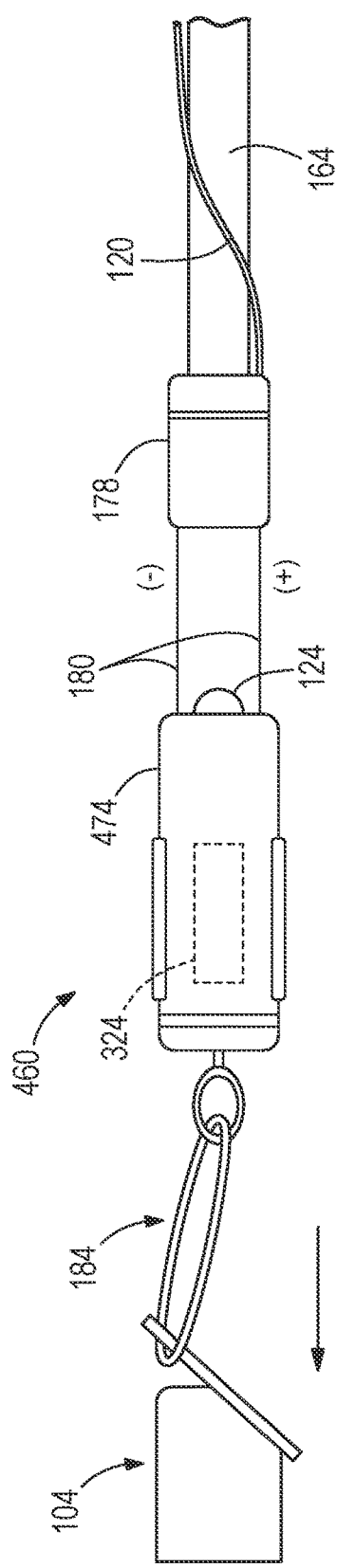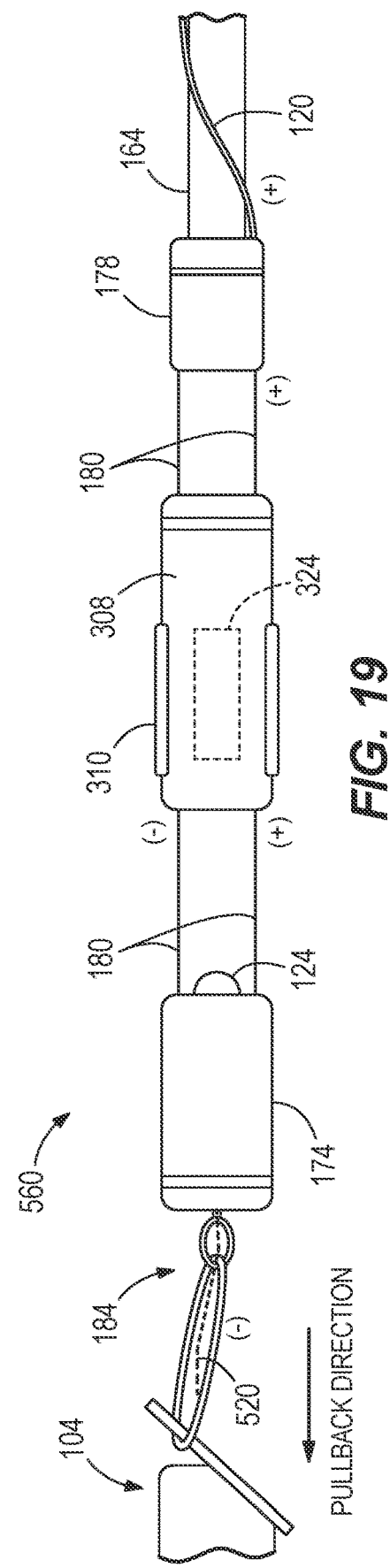

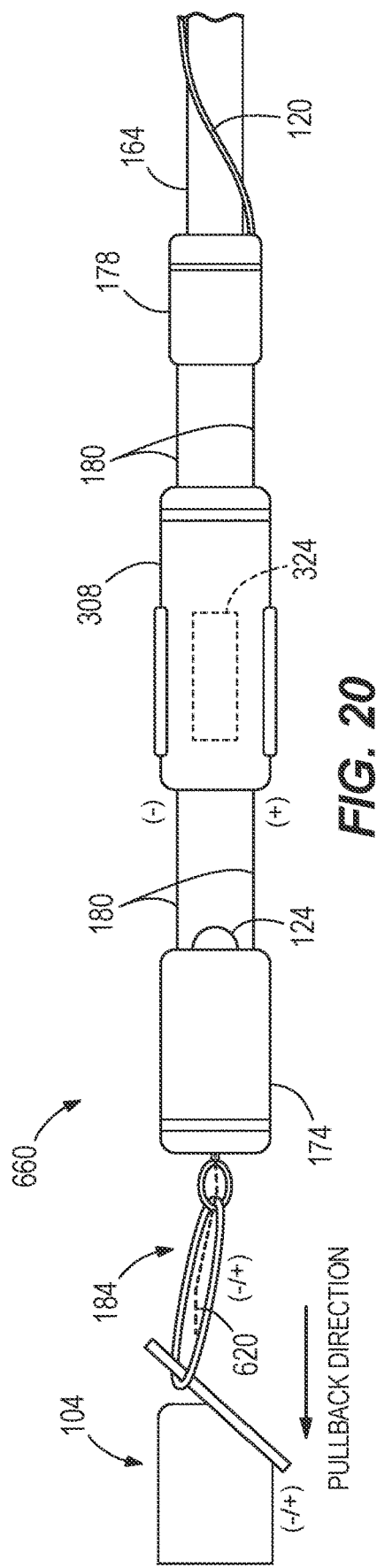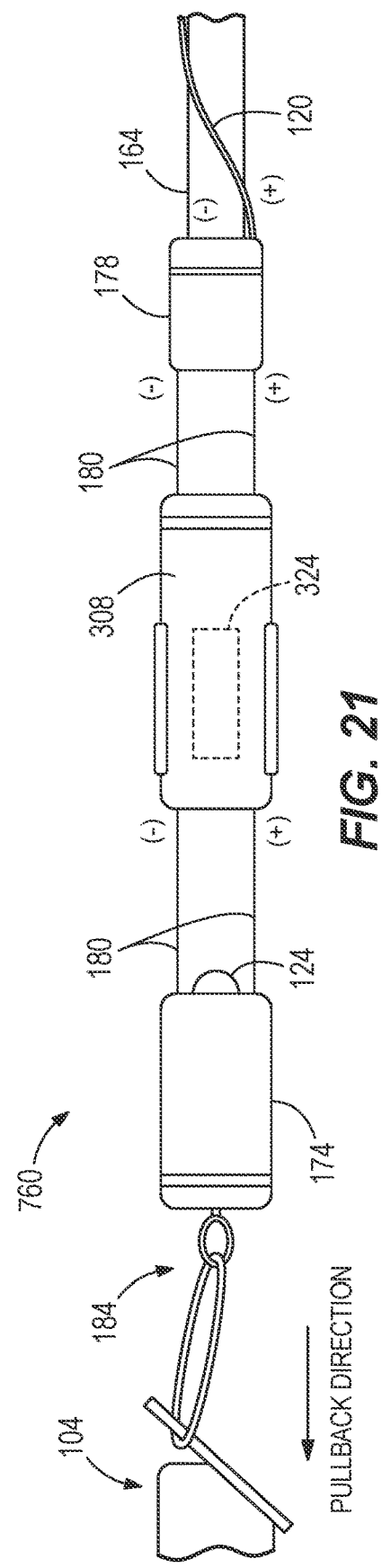

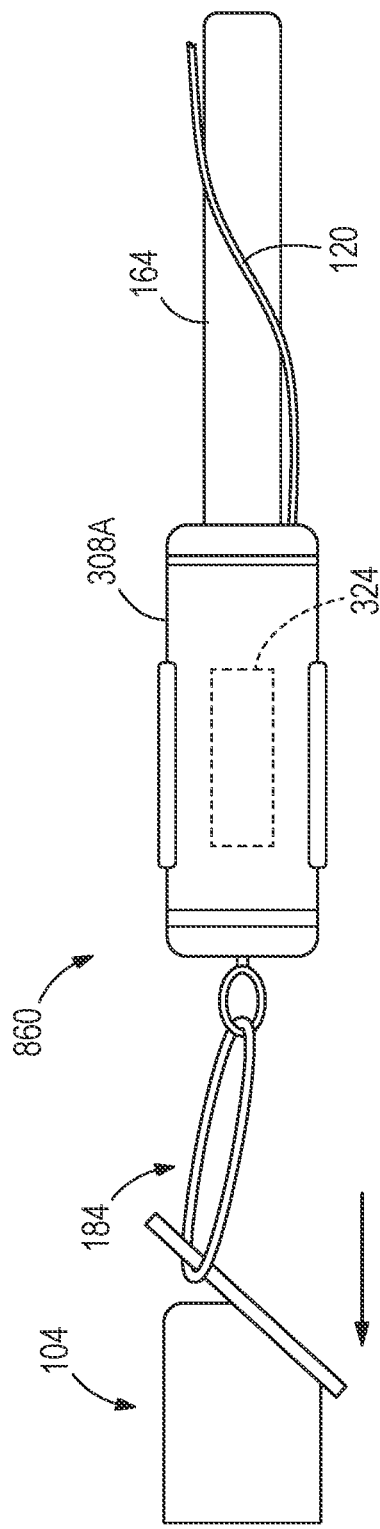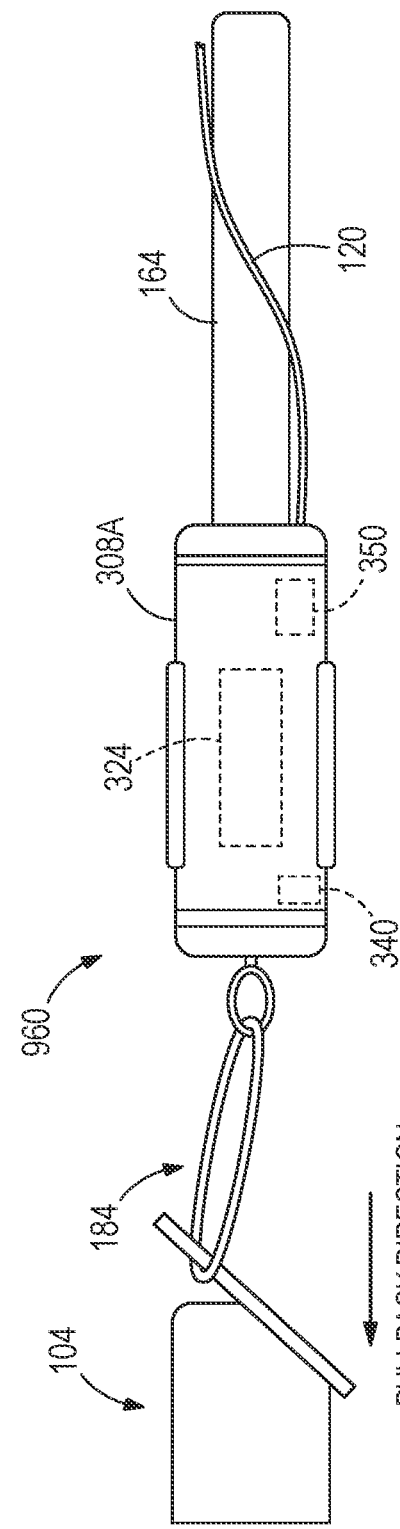

HORIZONTAL DIRECTIONAL DRILLING SYSTEM AND METHOD

CROSS-REFERENCE TO RELATED APPLICATIONS

This application is a continuation of U.S. patent application Ser. No. 17/949,389, filed Sep. 21, 2022, now U.S. Pat. No. 11,927,090, which is a continuation of U.S. patent application Ser. No. 17/155,793, filed Jan. 22, 2021, now U.S. Pat. No. 11,473,418, which claims priority to U.S. Provisional Patent Application No. 62/964,267, filed Jan. 22, 2020, the entire contents of both of which are incorporated by reference herein.

BACKGROUND

The invention relates to horizontal directional drilling (HDD) systems that are configured to drive a drill rod string into the ground for trenchless underground utility installation. Although HDD systems allow steering of the drill head to avoid creating crossbores with existing underground utility installations, crossbores may be created when HDD drilling is performed in an area with an unknown existing underground utility installation. Confirming that crossbores have not been created by the new HDD drill bore can be burdensome, leading to increased job time and cost.

SUMMARY

In one aspect, the invention provides a horizontal directional drilling method. A horizontal directional drilling machine is operated to power a drill string terminating at a drill head to create an underground borehole extending at least partially horizontally between an entry point and an exit point. A utility line and a pair of insulated wires are attached to the drill string at the exit point. An observation device is also attached to the drill string, and the observation device is connected with an uphole module via power line communication over the pair of insulated wires. The horizontal directional drilling machine performs a pullback of the drill string, with the utility line, the pair of insulated wires, and the observation device connected thereto, back toward the entry point. Data from the observation device are displayed on the uphole module during pullback of the drill string.

In another aspect, the invention provides a horizontal directional drilling system including a horizontal directional drilling machine and a drill string terminating at a drill head and configured to be driven by the horizontal directional drilling machine to create an underground borehole extending at least partially horizontally between an entry point and an exit point. An adapter assembly is configured to couple a utility line and a pair of insulated wires to the drill string. An observation device is configured to be attached to the drill string. An uphole module is connected with the observation device via power line communication over the pair of insulated wires.

In yet another aspect, the invention provides a horizontal directional drilling system including a horizontal directional drilling machine and a drill string terminating at a drill head and configured to be driven by the horizontal directional drilling machine to create an underground borehole extending at least partially horizontally between an entry point and an exit point. A camera is provided within an adapter assembly that couples a utility line to the drill string for installation of the utility line into the borehole during pullback of the drill string, and the camera is oriented to view in a direction opposite a direction of the pullback of the drill string. An uphole module is connected with the camera via power line communication over a pair of insulated wires. The power line communication utilizes at least one direct burial tracer wire that is connected to the drill string to extend along the utility line during pullback.

BRIEF DESCRIPTION OF THE DRAWINGS

FIG. 4 is a schematic view of a downhole portion of the video monitoring system, including an adapter assembly connected to a drill string for utility line installation.

FIG. 5 is a side view of a product connection portion of the adapter assembly.

FIG. 13 is a side view of an EM sensor housing of an alternate construction adapted to function also as a product connection portion of the adapter assembly.

FIG. 14 is a cross-section view of the EM sensor housing, taken along line 14-14 of FIG. 13.

FIG. 18 is a schematic view of a downhole portion of a monitoring system, according to another embodiment of the present disclosure, in which a multi-device housing is provided.

FIG. 19 is a schematic view of a downhole portion of a monitoring system, according to another embodiment of the present disclosure, in which power to downhole monitoring device(s) is provided via one tracer wire and one wire from the drill string.

FIG. 20 is a schematic view of a downhole portion of a monitoring system, according to another embodiment of the present disclosure, in which power to downhole monitoring device(s) is provided via two wires from the drill string.

FIG. 21 is a schematic view of a downhole portion of a monitoring system, according to another embodiment of the present disclosure, in which power to downhole monitoring device(s) is provided via one tracer wire and conductive utility line product being installed in the borehole.

FIG. 22 is a schematic view of a downhole portion of a monitoring system, according to another embodiment of the present disclosure, in which only an electromagnetic sensor is provided.

FIG. 23 is a schematic view of a downhole portion of a monitoring system, according to another embodiment of the present disclosure, in which an electromagnetic sensor is provided, along with at least one additional sensor, such as a strain gauge and/or pressure transducer.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
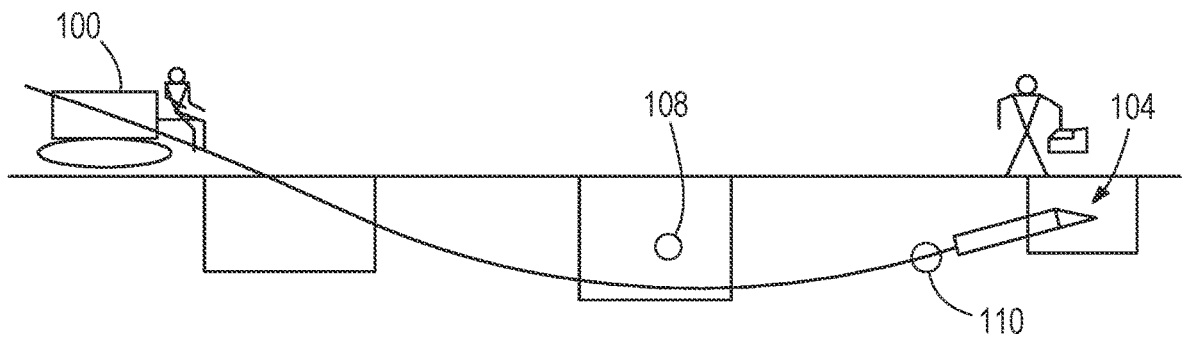
FIG. 1 is a schematic view of a horizontal directional drilling operation.

FIG. 1 illustrates a basic system for horizontal directional drilling (HDD), including a HDD machine 100 operable to perform trenchless, directional-controlled underground drilling between two points, e.g., for utility installations, such as gas lines. A plurality of drill rod assemblies are sequentially connected end-to-end on the HDD machine 100 to form a drill string. The drill string is driven into the ground by the HDD machine 100. At the end of the drill string is a drill head 104 having a rotating drilling tool or drill bit. The drill head 104 can include electronics (e.g., gyroscopic sensor(s), a data relay receiver, a beacon, a steering mechanism) for tracking and/or steering the drill head underground, and a wireline within the drill string connects the drill head electronics to the HDD machine 100 during operation. The HDD machine 100 includes a plurality of mechanical systems operable to assemble and disassemble a drill string and operable to plunge and retract the drill string into and out of the ground in a direction that is at least partially horizontal with respect to the ground. In this way, the HDD machine 100 can direct the drill head 104 to avoid an existing underground utility installation, e.g., a pre-existing storm sewer 108, that is known to the HDD machine operator. However, there remains the possibility of the HDD drill head 104 intersecting another underground utility installation 110, resulting in a "crossbore." The other underground utility installation 110 may be unknown to the operator, or known to the operator, but may not be avoided due to limited positional accuracy of the location information and/or steering capability of the drill head 104, especially in locations where many utilities are buried in close proximity to each other. Video data from a downhole camera may be used to inspect for crossbores. However, such a system has the propensity to add significant time and expense to the drilling process. For example, even if a camera is coupled to the drill head 104 at the exit pit and used to observe downhole conditions during pullback operation (retraction of the drill string, along with attached utility product, toward the HDD machine 100), there is a need to unfurl a long length of costly camera cable from a reel, and the camera cable must then also be retracted from the bore after the utility product is installed. Meanwhile, other systems may record information to memory that is downhole or may wirelessly transmit data to a processor on the ground, but these solutions present drawbacks of not offering real time information, or having real time information that is limited by wireless connection capability.

Figure 2:
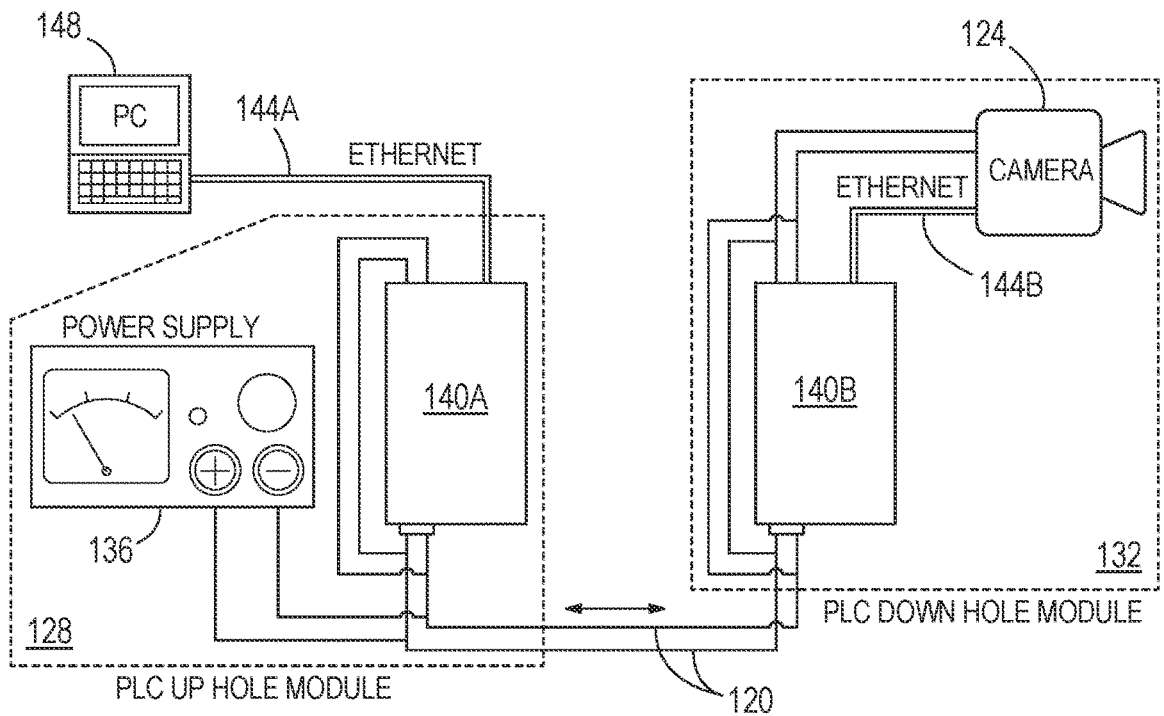
FIG. 2 is a schematic view of a video monitoring system for horizontal directional drilling, according to one embodiment of the present disclosure.
Figure 2A:
FIG. 2A is a cross-section of a two-conductor tracer wire including two isolated conductors within a common sheath.

As shown in FIG. 2, an improved observation or monitoring system and method for providing real time downhole observation data can be provided via utilization of tracer wires 120 and power line communication (PLC). PLC refers to the method of transferring electrical power and data for communication through the same network of wires from one end to the other end. Using PLC over the tracer wires 120 enables simultaneous powering of an observation device 124 along with transmission of data to/from the device 124, in a half-duplex manner, on the same lines as the power supply/distribution. The PLC may utilize Ethernet protocol. In the illustrated construction, the observation device 124 is a camera (e.g., digital Ethernet camera) such that the system is provided as a video monitoring system. The camera 124 allows direct observation of the borehole, and this can be implemented for providing real time uphole video monitoring, although the video data may also be recorded and saved. Details relating to the camera 124, including lenses, circuit boards, and lights, among other aspects, may be similar in many respects to those disclosed in U.S. Pat. Nos. 9,651,711 and 9,399,910, the entire contents of which are incorporated by reference herein. The tracer wires 120 are simple conductors, insulated and rated for direct burial, that are installed alongside the utility line to remain underground along the utility line for later use in locating or "tracing" the utility line from ground level. A tracer wire is conventionally installed along a utility line, exclusively for the purpose of enabling detection by an electromagnetic probe after the installation is complete. However, as detailed below, using a pair of tracer wires 120 as power line communication lines during utility installation to power the camera 124 and send/receive camera data, several advantages are realized. The system includes an uphole module 128 and a downhole module 132 at opposite ends of the tracer wires 120. The tracer wires 120 can be an untwisted pair of insulated conductors, although use of a twisted pair of conductors is also contemplated. Further, the tracer wires 120 can be provided as separate, loose wires or alternately, combined as two isolated conductors within a common sheath, thus effectively forming a single, two-conductor tracer wire 120' (FIG. 2A). Although reference is made in the description and drawings of tracer wires 120, certain aspects of the disclosure can include a system and method for using PLC for real time borehole monitoring over a pair of insulated conductors (e.g., conductive product and/or drill string wireline) that are not subsequently buried as tracer wires.

The uphole module 128 includes a power supply 136 operable to supply electrical power (e.g., DC at a predetermined voltage, which may be between 5V and 20V) to the camera 124 via the tracer wires 120. Electrical power is also supplied to an uphole PLC encoder 140A that is configured to communicate data (e.g., bi-directionally) over the tracer wires 120 that power the components of the downhole module 132. A first data communication line 144A connects the uphole PLC encoder 140A (e.g., through Ethernet connections) to a computer 148, which may be a desktop computer, laptop computer, or other handheld computer device such as a tablet or smartphone. The computer 148 may include or be connected with a monitor or display configured to display the data received over the tracer wires 120 from the camera 124 for viewing. The computer 148 may also include internal and/or external memory. Software loaded on the computer 148 may be executable to provide instructional commands to the camera 124, which may include commands to change one or more settings of the camera 124, such as aperture and/or focal length. The software may also enable real time display of a view of the camera 124 while downhole. In addition to the camera 124, the downhole module 132 includes another PLC encoder 140B ("child" or "slave" unit) that is coupled to the uphole PLC encoder 140A ("parent" or "master" unit) through the pair of tracer wires 120. The downhole PLC encoder 140B is connected to the camera 124 through a second data communication line 144B (e.g., through Ethernet connections). As such, the downhole PLC encoder 140B is operable to receive the data output (e.g., video of a suitable format) of the camera 124 and transform the data for transmission over the tracer wires 120 by PLC, as DC power is supplied over the tracer wires 120 to the downhole module 132. In particular, both the camera 124 and the downhole PLC encoder 140B are energized by electrical power supplied through the tracer wires 120 (e.g., throughout a pullback operation in which utility line product is installed into the borehole created by the HDD drill string).

Figure 3A:
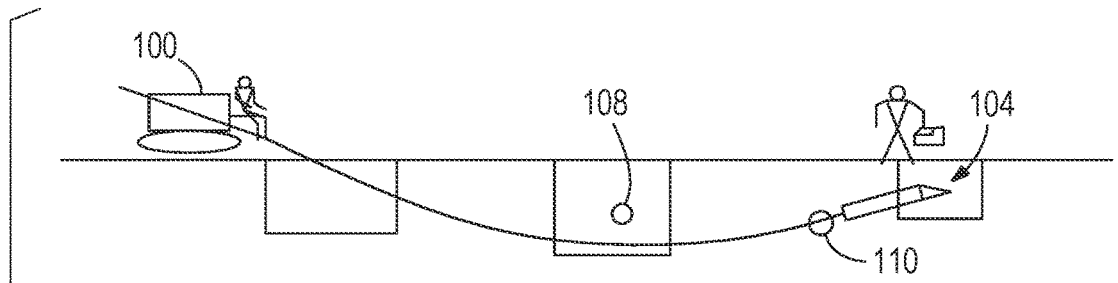
FIG. 3A is a schematic process view illustrating a first step in an exemplary method of using the video monitoring system of FIG. 2 to identify a crossbore during utility line installation.
Figure 3B:
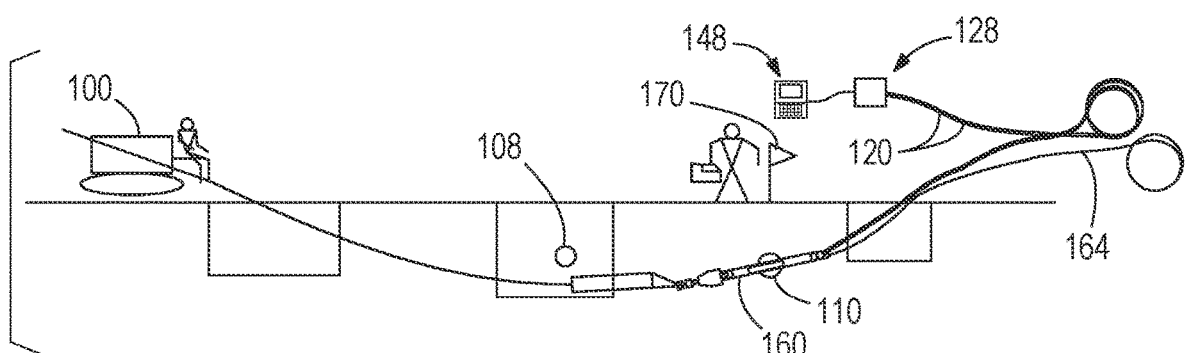
FIG. 3B is a schematic process view illustrating a second step of the exemplary method of using the video monitoring system of FIG. 2 to identify a crossbore during utility line installation.
Figure 3C:
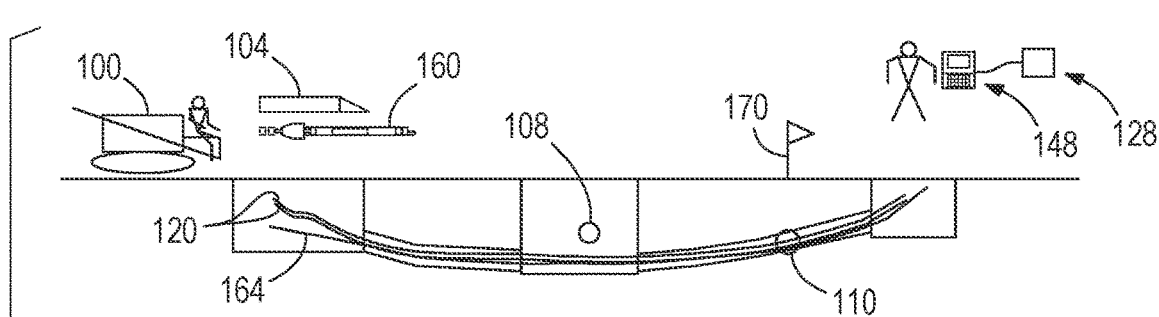
FIG. 3C is a schematic process view illustrating a third step of the exemplary method of using the video monitoring system of FIG. 2 to identify a crossbore during utility line installation.
Figure 3D:
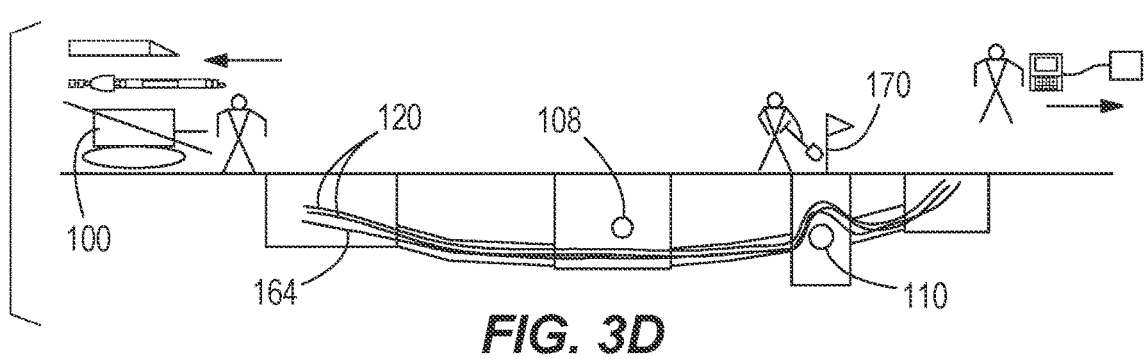
FIG. 3D is a schematic process view illustrating a fourth step of the exemplary method of using the video monitoring system of FIG. 2 to identify a crossbore during utility line installation.

FIGS. 3A to 3D illustrate a process for utility line installation, using the HDD machine 100, that takes advantage of the system of FIG. 2 to provide real time video data transmission through tracer wires 120 to an uphole display for monitoring. FIG. 3A illustrates creation of a new borehole utilizing the drill head 104 coupled to the HDD machine 100 through a drill string of numerous drill rods assembled sequentially at the HDD machine 100. Conventional HDD steering techniques allow the operator(s) to navigate the drill head 104 around a pre-existing underground utility installation 108 between the entry and exit points, such as pits. Unbeknownst to the operator(s), the drill head 104 has intersected another underground utility installation 110. At the exit pit, an adapter assembly 160 is coupled to the drill head 104 for attaching utility line 164 and the tracer wires 120 to be installed into the borehole. The HDD machine 100 is operated to pull the utility line 164 and the tracer wires 120 through the borehole from the exit pit to the entry pit. The downhole PLC module 132, including the camera 124, is integrated with or carried by the adapter assembly 160. As detailed further below, the camera 124 is rear-facing. That is, an image sensor and/or lens of the camera 124 is pointed opposite to the direction of travel as the utility line 164 and the drill string are pulled back toward the HDD machine 100. Thus, the camera 124 can still observe the pertinent surroundings for identifying a crossbore, but is less susceptible to gathering or impacting debris within the borehole. Because real time video data is transmitted uphole, the existence of a crossbore, e.g., at 110, can be identified in real time. During the pullback operation, an operator can log or mark the location of the crossbore for future reference. This is illustrated by placement of the flag marker 170 in FIG. 3B. At completion of pullback, the drill head 104 and the adapter assembly 160 can be disassembled adjacent the entry pit (FIG. 3C). In particular, the adapter assembly 160 containing the downhole PLC module 132 is disconnected from the tracer wires 120, which are buried in the borehole along the installed utility line 164. Further, the uphole PLC module 128, which may be located adjacent the exit pit, is also disconnected from the tracer wires 120. The installation is then complete, albeit with the noted crossbore. No further operations of the HDD machine 100 and drill string are necessary through the borehole following the installation of the utility line 164 and the tracer wires 120 with the camera-enabled adapter assembly 160. Thus, workers and/or equipment (including the HDD machine 100 and/or the PLC modules 128, 132) can immediately leave the worksite as shown in FIG. 3D, while an excavation commences for rectifying the crossbore at 110.

FIG. 4 illustrates a downhole portion of the video monitoring system as connected to the drill string, in particular the adapter assembly 160 connected between the drill head 104 and the utility line 164 being installed. The adapter assembly 160 shown in FIG. 4 includes a pair of separate housings 174, 178 secured by multiple electrically-insulated high-strength conductors 180. From the left side of FIG. 4 where the drill head 104 is shown, the first housing 174 of the adapter assembly 160 is the camera housing supporting the camera 124. A first end of the camera housing 174 includes a connection structure for attachment with the drill head 104, e.g., through a linkage 184, which may include shackles, swivels, links, and/or rings. The camera 124 is positioned at the second end of the camera housing 174 so as to view opposite the pullback direction and toward the second housing 178, which serves as a camera target and product connection portion of the adapter assembly 160, as it makes a secure connection (e.g., via swage, eye bolt, or other connection structure as shown in broken lines in FIG. 5) to the utility line product 164 being installed. Power line communication is transmitted through the tracer wires 120 to the product connection portion 178 of the adapter assembly 160 and through the electrically-insulated high-strength conductors 180 to the camera housing 174.

With further reference to FIGS. 5-10, the product connection portion 178 includes a central housing body 188 (e.g., cylindrical-shaped body) and first and second end caps 190, 192 secured at opposite ends of the housing body 188. The end caps 190, 192 can be connected directly to the housing body 188, directly to each other (without a separate housing body 188), or through respective threaded adapters 194 as shown. Some or all of these parts of the product connection portion 178 may be constructed of anodized aluminum, among other metals or materials. The first end cap 190, shown in greater detail in FIG. 9, establishes mechanical connections with the high-strength conductors 180. The high-strength conductors 180 can be wire rope (e.g., steel, particularly stainless steel), commonly referred to as "aircraft cable," and the construction of the aircraft cable can be what is known as a 7×19, which is 7 groups of 19 strands per group, in some embodiments, although other constructions may be utilized in other embodiments. Each high-strength conductor 180 can have a rope portion that is covered in insulation (e.g., PVC coating) and a fitting portion 196 at the end thereof. The fitting portion 196 can be a steel sleeve having one or more threaded portions configured for clamping engagement with the end cap 190. In particular, an exterior nut 200 can be threaded onto the fitting portion 196 on an outside of the end cap 190, and one or more interior nuts 202, 204 can be threaded onto the fitting portion 196 on an inside of the end cap 190. Between the exterior 200 and interior 202, 204 nuts, the fitting portion 196 defines a shank or shaft that extends through a through hole 206 of the end cap 190 and an insulator bushing 208 (e.g., PEEK plastic) positioned therein. The exterior nut 200 compresses a flange portion of the insulator bushing 208, or another seal member, against an exterior face of the end cap 190 to seal the through hole 206. An additional seal ring 212 (e.g., O-ring) may be provided along the interior of the through hole 206, between the end cap 190 and the insulator bushing 208. It is noted that the fitting portion 196 is electrically conductive in order to transmit power and data between the wire rope portion and the interior of the product connection housing 178. An exterior part of the fitting portion 196, along with the exterior nut 200 in some constructions, may be at least partially covered or wrapped in insulating material such as PTFE (e.g., heat-shrink). Such insulating material may also be provided on the exterior surface(s) of the end cap 190, although the end cap 190 is electrically isolated from the high-strength conductors 180 by the respective insulator bushings 208.

Figure 9:
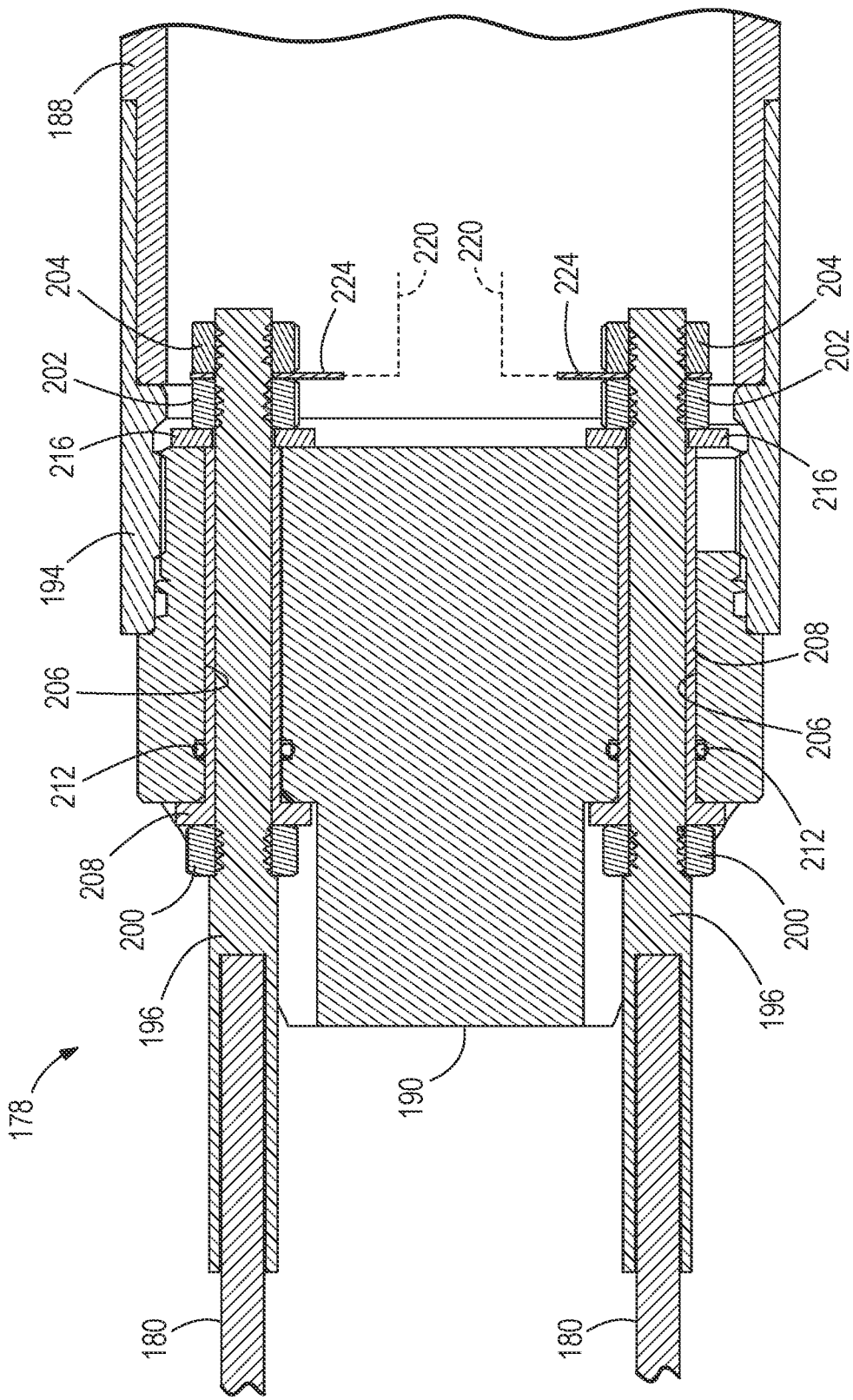
FIG. 9 is a detail view of a first end of the product connection portion as shown in FIG. 6.

Turning to the inside of the endcap 190, a washer 216 constructed of insulating material (e.g., PEEK plastic) is situated between the interior end of the end cap 190 and the first interior nut 202. The washer 216 is arranged to be compressed for the transfer of load from the interior end of the high-strength conductor 180 to the end cap 190 when the drill string is pulled back toward the HDD machine 100. Similar connections (not shown) may be made between the high-strength conductors 180 and the camera housing 174 (e.g., an end cap thereof). Each of the camera and product connection housings 174, 178 further house internal electrical conductors, including wires and connections for example, that are non-load-bearing, such that the pullback loads are borne exclusively by the housings 174, 178 and the interconnecting high-strength conductors 180. As shown in FIG. 9, a pair of internal electric conductors 220 (e.g., insulated wires) are coupled to the interior ends of the high-strength conductors 180, respectively. The internal conductors 220 can be connected to the respective high-strength conductors 180 directly by wrapping a wire end into or around the fitting portion 196. In some constructions, each internal conductor 220 at its end further includes a connector 224, for example, in the form of a tab or ring terminal as shown. The connector 224 is placed between the interior nuts 202, 204 and clamped therebetween. The connections between the high-strength conductors 180 and the first end cap 190 are permanent in that they need not be connected and disconnected on the work site, or even between separate uses at distinct work sites. Rather, once assembled, the product connection housing 178 is not designed to require routine disassembly or service. Likewise, the entire adapter assembly 160 need not be assembled and disassembled during the course of a full process of use, other than making connections with the drill head 104 on one end, and the utility line 164 and tracer wires 120 at the second end.

Figure 6:
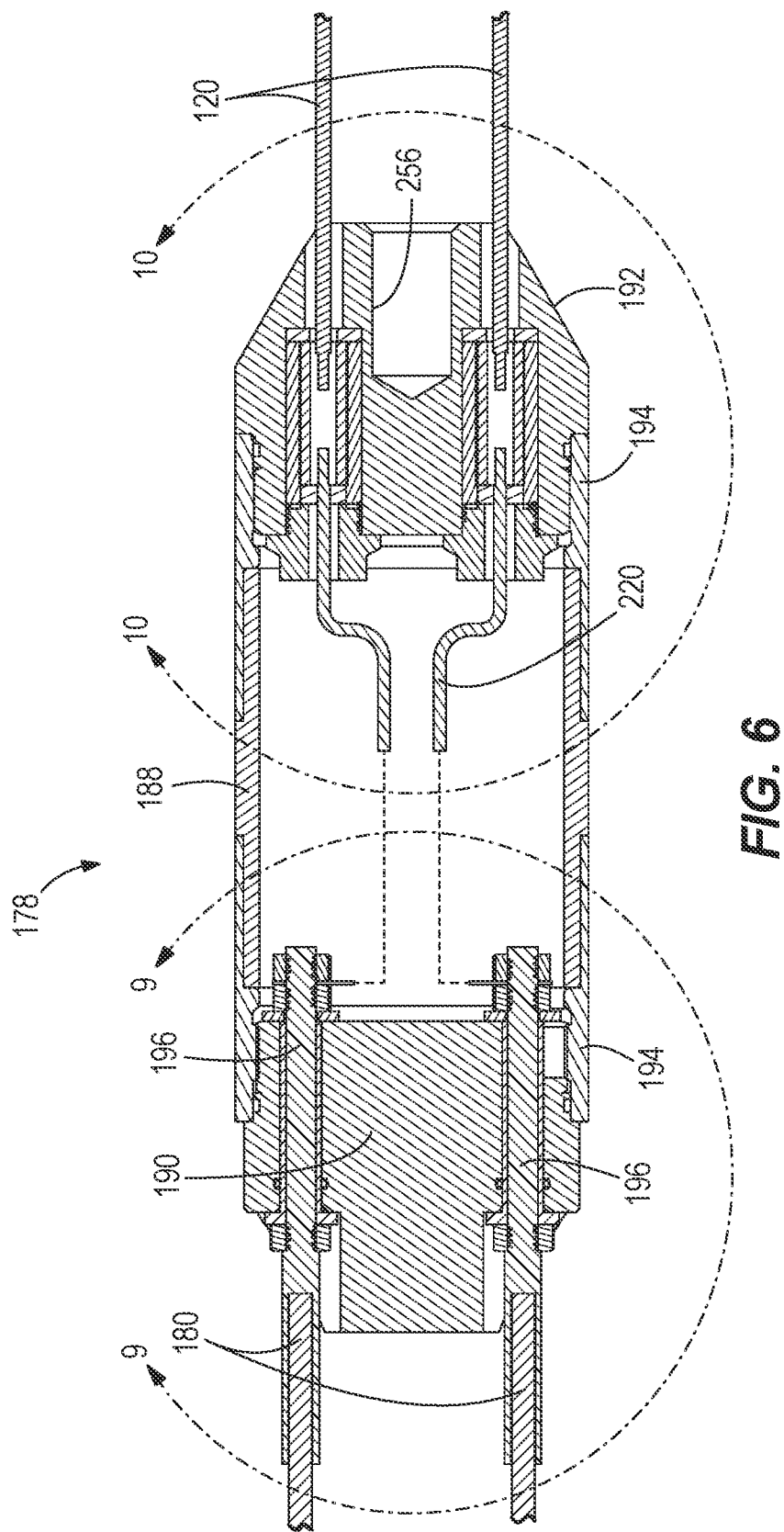
FIG. 6 is a cross-section view of the product connection portion, taken along line 6-6 of FIG. 5.
Figure 7:
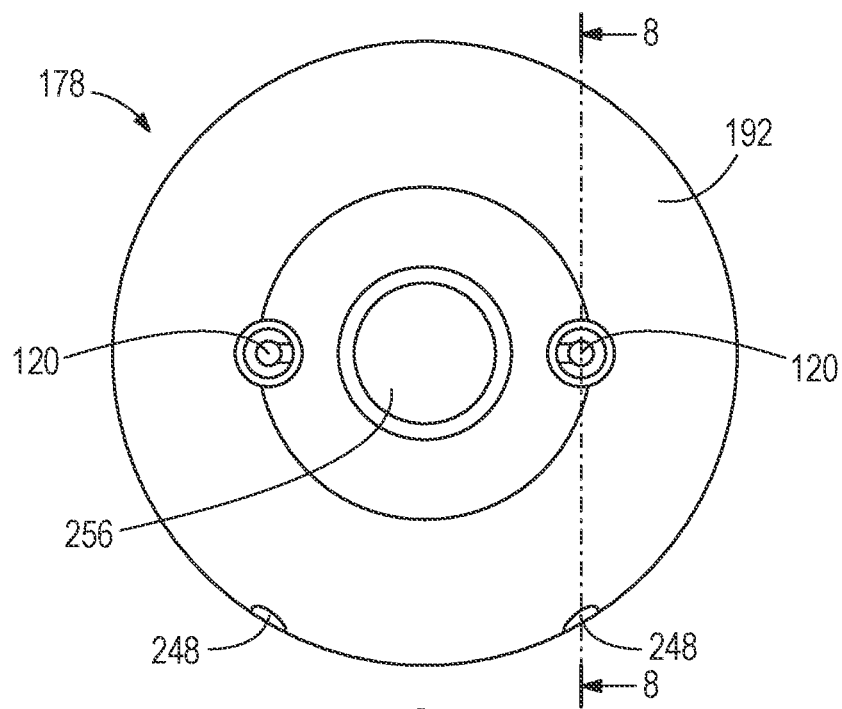
FIG. 7 is an end view of the product connection portion of FIGS. 5-6.
Figure 8:
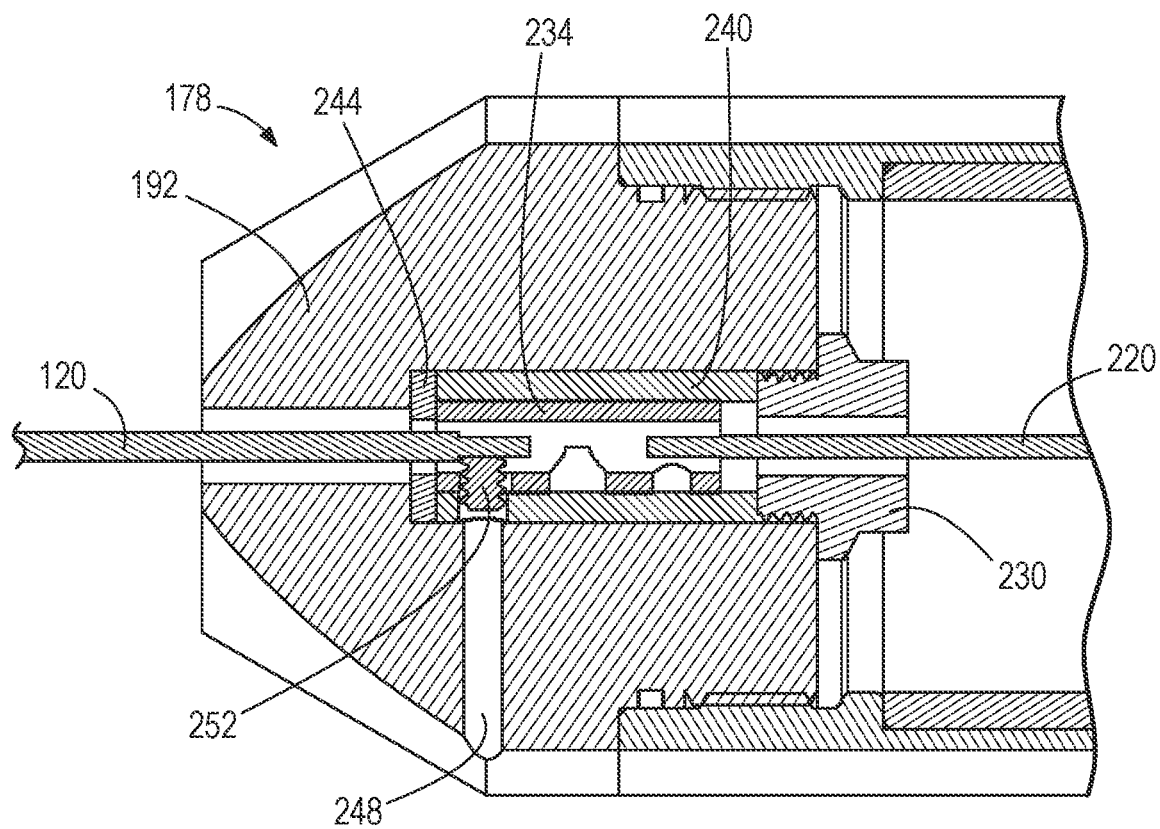
FIG. 8 is a cross-section view of the product connection portion, taken along line 8-8 of FIG. 7.
Figure 10:
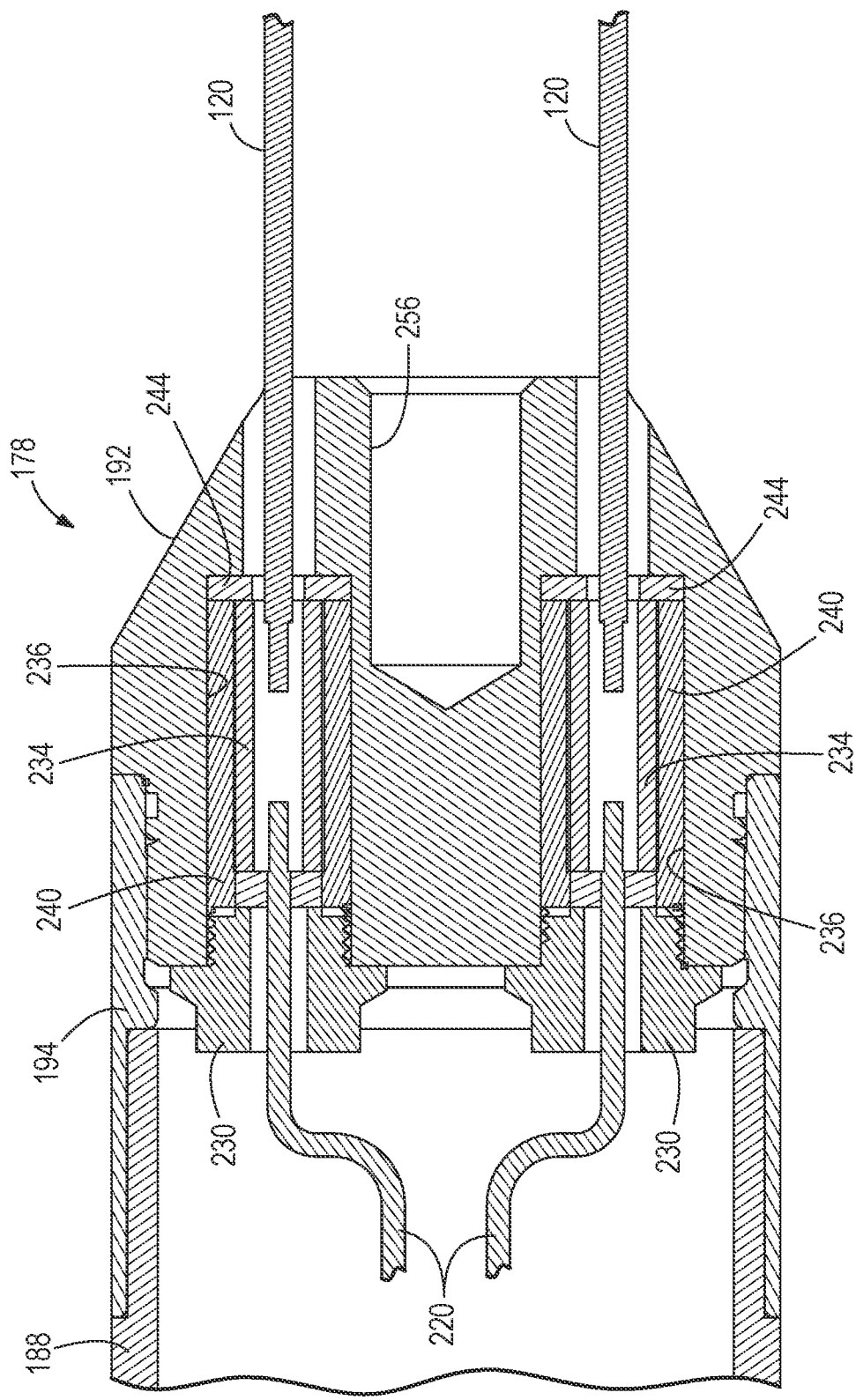
FIG. 10 is a detail view of a second end of the product connection portion as shown in FIG. 6.

As each utility line installation in which the adapter assembly 160 is used requires the attachment and subsequent detachment of the tracer wires 120, the second end cap 192 of the product connection housing 178 is adapted to facilitate efficient handling of the same. As shown in FIG. 10, the internal conductors 220 extend from their first ends at the high-strength conductors 180, through respective pass-through screws 230, to second ends that terminate at a connector 234. The internal conductors 220 can each be in electrically conductive contact with the connector 234, and fixed or bonded thereto, e.g., by epoxy or other means. By epoxy or other means, a permanent or semi-permanent, sealed connection is established such that the internal conductors 220 and the inside of the product connection housing 178 is sealed from the surrounding environment at the connector 234. Each connector 234 is housed in a corresponding cavity 236 in the second end cap 192, and is electrically isolated therefrom by an interstitial insulator 240, for example a rubber sleeve or tube. The insulator 240 can be compressed into the cavity 236 when the pass-through screws 230 are installed (i.e., by threading into apertures on the interior surface of the second end cap 192). At the bottom of each cavity 236, opposite the screws 230, there may be provided washers 244 of silicone or another similar material, providing a clearance or interference fit with the exterior surfaces of the respective tracer wires 120. As shown in FIGS. 7 and 8, access passages 248 are formed in the second end cap 192, from a peripheral or outer radial surface, to provide tool access (e.g., for a screwdriver, hex key, etc.) for reaching a screw 252 that pinches or clamps the end of the tracer wire 120 to the connector 234, establishing mechanical and electrical connection therewith. The two access passages 248 can be provided parallel to each other on the same side of the second end cap 192, so that the technician need not reorient the product connection housing 178 when coupling or decoupling the pair of tracer wires 120. On the exterior of the second end cap 192 between the two tracer wires 120 is a blind hole 256 (e.g., threaded), as shown in FIGS. 6, 7 and 10, provided for securement of an eye bolt or other structure used to make the connection with the utility line product 164.

FIGS. 11-17 relate to an improved observation or monitoring system, and individual portions thereof, configured to provide real time downhole observation data via utilization of tracer wires 120 for data transmission, which in some constructions may be both data and power transmission via power line communication (PLC). Using PLC over the tracer wires 120 enables simultaneous powering of multiple observation devices 124, 324 along with transmission of data to/from the devices 124, 324, in a half-duplex manner, on the same lines as the power supply/distribution. However, it should be explicitly noted that some aspects of the disclosure may provide data transmission over the tracer wires 120, separate from electrical power supply to the device(s), which may instead be provided by other means, e.g., on-board battery(ies). Except as noted, details of the system components, and operations/methods thereof can be similar to the above-described video monitoring system. As such, reference can be made to the above description for such details, while the additional description below is focused upon features not already disclosed above. Like reference numbers are used where appropriate for like components. In the illustrated construction, the first observation device 124 is a camera (e.g., digital Ethernet camera) such that the system is provided as a video monitoring system, for providing real time uphole video monitoring in accordance with the first embodiment disclosed herein. However, the system can be a combined video and electromagnetic monitoring system, as the second device 324 can be provided as an electromagnetic (EM) sensor that is independently able to observe the borehole during pullback. In some constructions, the EM sensor 324 is a more cost effective and less complex solution as compared to ground penetrating radar. However, in other constructions, the EM sensor 324 operates to detect timed reflected radio waves such that it operates as a nearfield radar sensor.

The electromagnetic (EM) sensor 324 includes an antenna arrangement and circuitry configured to detect changes in one or more antenna performance characteristics indicative of a crossbore. As shown, the EM sensor 324 can include a first antenna 300 operable as a transmitter for emitting EM radiation into the surrounding borehole, and a second antenna 304 operable as a receiver for receiving EM radiation. The circuitry operatively coupled with the antenna arrangement of the EM sensor 324 controls the emission of EM radiation from the first antenna 300 and interprets the signals from the second antenna 304 in order to create a borehole map, or "see" the borehole, e.g., in order to detect a crossbore. For example, the EM sensor 324 can detect a large nearfield reflection caused by the property change along the borehole, changes in coupling between antennas 300, 304, and/or how well energy is coupled from the antenna arrangement to the media forming the borehole. In some constructions, the receiving antenna 304 records a large amplitude bloom from the change in permittivity between soil and void upon passage by a crossbore. Crossbore detection by the EM sensor 324 utilizes changes in antenna performance, rather than radar per se, as no imaging or reflected signals are used (e.g., no timed reflected signal is measured, or is range data available). Further details of the EM sensor 324, including the construction and usage of data can be found in PCT Patent Application Publication No. WO 2018/049024 assigned to Vermeer Manufacturing Company and Merlin Technology, Inc., or U.S. Patent Application Publication No. 2016/0265347 assigned to The Charles Machine Works, Inc. and Louisiana Tech University Research Foundation, the entire contents of each of which are incorporated by reference herein.

Figure 11:
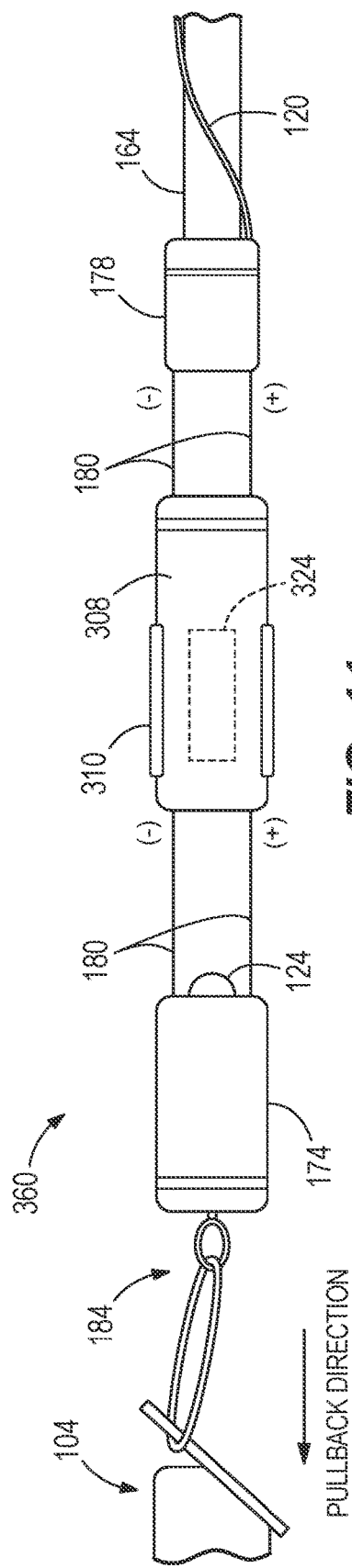
FIG. 11 is a schematic view of a downhole portion of a multi-source monitoring system, including an adapter assembly connected to a drill string for utility line installation.

With reference to FIG. 11, a downhole portion of the monitoring system includes an adapter assembly 360 connected between the drill head 104 and the utility line 164 being installed. The adapter assembly 360 shown in FIG. 11 includes a pair of separate device housings 174, 308 and a third housing 178 that acts as the product connection portion of the adapter assembly 360 by making a secure connection (e.g., via swage, eye bolt, or other connection structure) to the utility line product 164 being installed. From the left side of FIG. 11 where the drill head 104 is shown, the first housing 174 is the camera housing supporting the camera 124. The second device housing 308 is the EM sensor housing, or antenna housing, supporting the EM sensor 324. As such, the EM sensor housing 308 can include at least one antenna window 310 transmissive to the EM radiation sent/received by the EM sensor 324. The EM sensor housing 308 is secured to each one of the camera housing 174 and the product connection portion 178 by respective sets of high-strength conductors 180. As in the preceding embodiment, the first end of the camera housing 174 includes a connection structure for attachment with the drill head 104, e.g., through a linkage 184, which may include shackles, swivels, links, and/or rings, while the camera 124 is positioned at the second end so as to view opposite the pullback direction. As described with further reference to FIG. 12, power line communication (PLC) is transmitted through the product connection portion 178 of the adapter assembly 160, through a first set of the high-strength conductors 180 to the EM sensor housing 308, and then through a second set of the high-strength conductors 180 to the camera housing 174.

Figure 12:
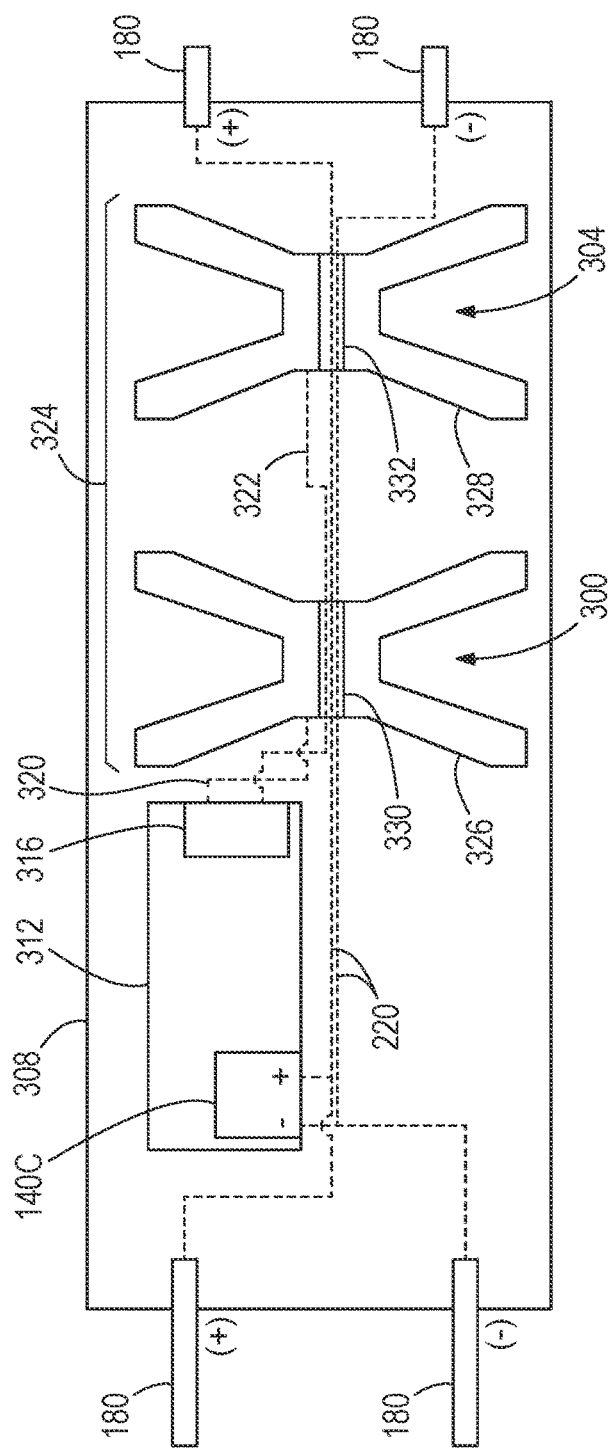
FIG. 12 is a wiring diagram of an EM sensor housing of the adapter assembly of FIG. 11.

As shown in FIG. 12, the two antennas 300, 304 are contained within the EM sensor housing 308, along with an electronic control subassembly 312. The electronic control subassembly 312 can include or be in the form of one or more circuit boards, among other elements. The electronic control subassembly 312 can include a downhole PLC encoder 140C for the EM sensor 324. The PLC encoder 140C is in communication with an uphole PLC encoder, power supply, and computer/monitor forming an uphole module, as described above with reference to the embodiment of FIG. 2. The downhole PLC encoder 140C is operatively connected through the electronic control subassembly 312 with an EM signal processor circuit 316, which in turn is connected to the two antennas 300, 304 through respective antenna connection wires or cables 320, 322. The antennas 300, 304 include respective antenna shells 326, 328 having apertures 330, 332 for passage of PLC power/signal, along internal electric conductors 220 between the high-strength conductor pairs 180 on opposite ends of the EM sensor housing 308. The aperture 330 in the first antenna shell 326 may also receive the antenna connection wire 322 for passage to the second antenna 304. In further embodiments, additional instruments and/or sensors are provided in the EM sensor housing 308, and each of these may also be connected with the uphole module via PLC through the electronic control subassembly 312. Examples include but are not limited to: strain gauge(s), pressure transducer(s), temperature sensor(s), and/or ground penetrating radar. Such instruments and/or sensors may be used in crossbore detection and/or for separate purposes.

Although the monitoring system as shown in FIG. 11 incorporates a product connection portion 178 that is distinct from the device housings 174, 308, it is also conceived to incorporate features of the product connection portion 178 into the nearest device housing, in this case the EM sensor housing 308. FIGS. 13 and 14 illustrate such an embodiment of an EM sensor housing 308A.

The EM sensor housing 308A as shown in FIGS. 13 and 14 includes a central housing body 388 (e.g., cylindrical-shaped body) that is entirely or partially transmissive to the EM signals of the EM sensor 324 so as to form an antenna window(s). The EM sensor housing 308A further includes first and second end caps 190, 192 secured at opposite ends of the housing body 388. The end caps 190, 192 can be connected directly to the housing body 388, directly to each other (without a separate housing body 388), or through respective threaded adapters 194 as shown. Some or all of these parts of the EM sensor housing 308A may be constructed of anodized aluminum, among other metals or materials. The first end cap 190, shown in greater detail in FIG. 15, establishes mechanical connections with the high-strength conductors 180 that extend to the camera housing 174. The construction of the first end cap 190, the high-strength conductors 180, and the connection therebetween can be similar to that described above for the first end cap 190 of the production connection portion 178. As such, like reference numbers are used, and the above description is hereby referenced so as to avoid redundant description.

Figure 15:
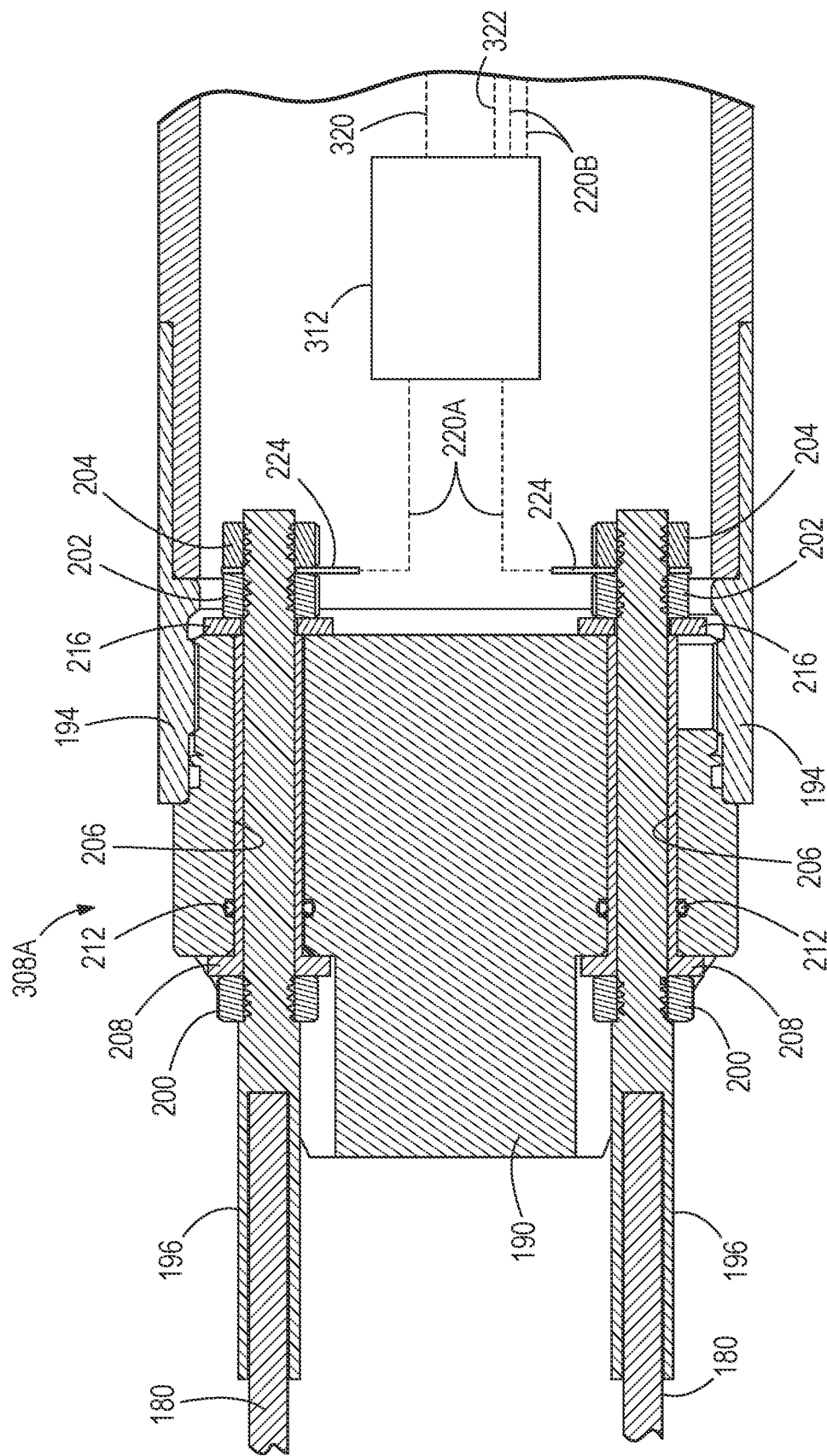
FIG. 15 is a detail view of a first end of the EM sensor housing as shown in FIG. 14.
Figure 16:
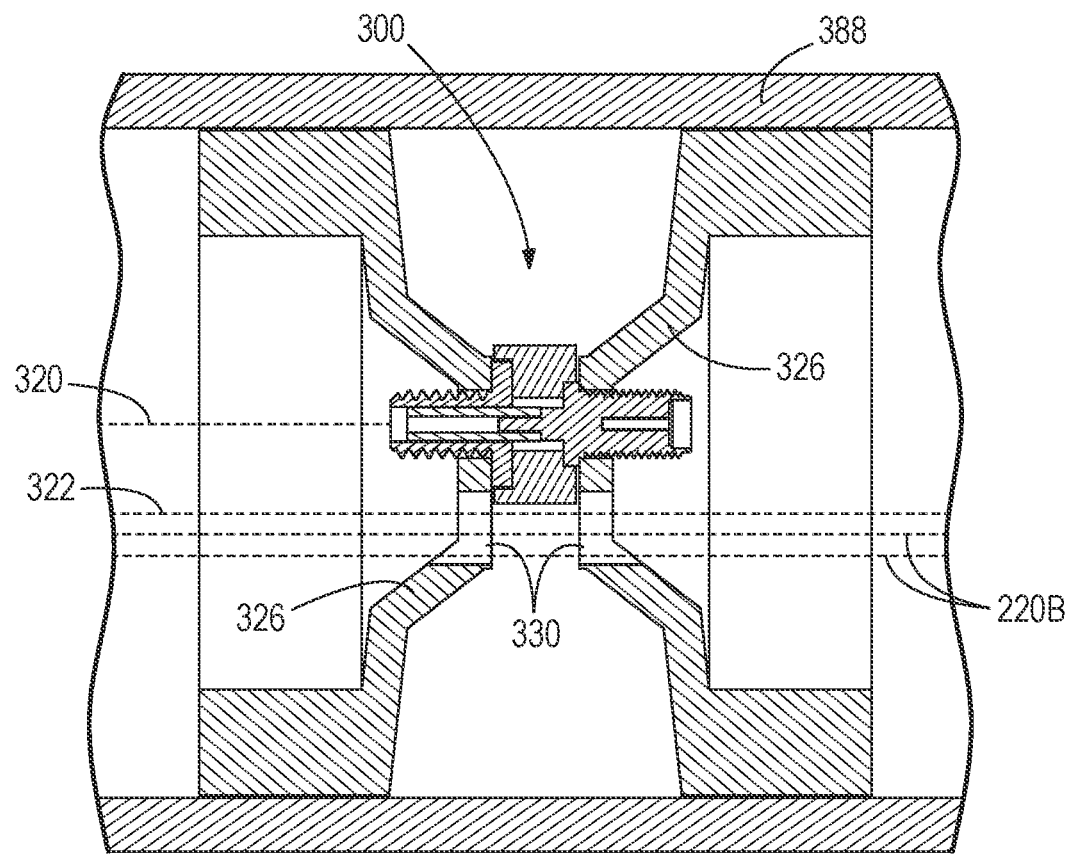
FIG. 16 is a detail view of an antenna portion of the EM sensor housing as shown in FIG. 14.
Figure 17:
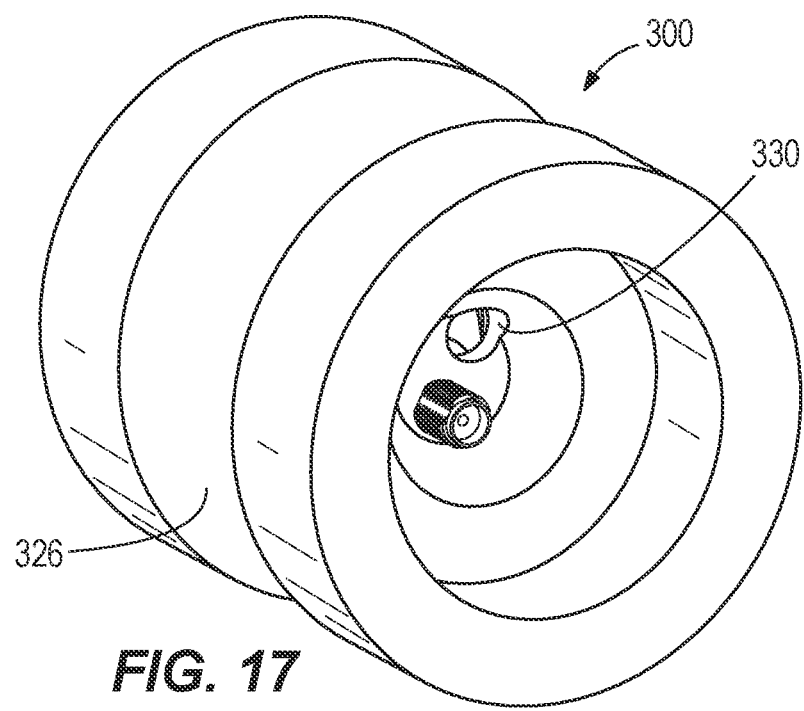
FIG. 17 is a perspective view of an antenna portion of the EM sensor.

As shown in FIGS. 14 and 15, a first pair of internal electric conductors 220A (e.g., insulated wires) are coupled to the interior ends of the high-strength conductors 180, respectively. The internal conductors 220A can be connected to the respective high-strength conductors 180 directly by wrapping a wire end into or around the fitting portion 196. In some constructions, each internal conductor 220A at its end further includes a connector 224, for example, in the form of a tab or ring terminal as shown. The connector 224 is placed between the interior nuts 202, 204 and clamped therebetween. The connections between the high-strength conductors 180 and the first end cap 190 are permanent in that they need not be connected and disconnected on the work site, or even between separate uses at distinct work sites. Rather, once assembled, the EM sensor housing 308A is not designed to require routine disassembly or service. Likewise, the entire adapter assembly 360 need not be assembled and disassembled during the course of a full process of use, other than making connections with the drill head 104 on one end, and the utility line 164 and tracer wires 120 at the second end. The first pair of internal conductors 220A connect to the electronics control subassembly 312 (e.g., the PLC encoder 140C thereof), which in turn connects to the tracer wires 120 via a second pair of internal electrical conductors 220B (FIG. 14). In other constructions, PLC may be transmitted between the tracer wires 120 and the high-strength conductors 180 by a single pair of internal electrical conductors that extend external to the electronics control subassembly 312, which may be powered by jumper lines tapped from the pair of internal electrical conductors as shown in FIG. 12. The second pair of internal electrical conductors 220B pass through the apertures 330, 332 of the respective antenna shells 326, 328. The apertures 330, 332 can be positioned off-center with respect to a central axis A As described above with respect to the adapter assembly 160, the second end cap 192 is configured for the attachment and subsequent detachment of the tracer wires 120 (FIG. 14). The second pair of internal conductors 220B extend through the respective antenna shell holes 330, 332 to the respective pass-through screws 230 on the inside surface of the second end cap 192. As shown in FIGS. 16 and 17, each antenna shell 326, 328 can include two shell halves fastened together with a fastener assembly such that the antenna coil or element is located therebetween. From the second antenna shell 328, the internal conductors 220B extend to the connectors 234 to be fixed or bonded thereto, e.g., by epoxy or other means. The second end cap 192 may have the same construction as described above with respect to FIG. 10, including for example, the insulator 240, washers 244, and access passages 248 for tightening or loosening screws (not shown) that pinch or clamp the ends of the respective tracer wires 120 to the connector 234. Further, as mentioned above, the second end cap 192 can include a structure such as a blind hole 256 (e.g., threaded) for securement of an eye bolt or other structure used to make the connection with the utility line product 164.

FIG. 18 illustrates yet another embodiment of an adapter assembly 460 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 460 can be similar to the adapter assembly 360 as shown in FIG. 11, including the camera 124 and the EM sensor 324, among other possible instruments or sensor as noted above. However, the camera 124 and the EM sensor 324 are packaged together in a single housing 474, or multi-device housing. The multi-device housing 474 has a first end coupled to the drill head 104 and a second opposite end coupled to the product connection portion or housing 178 through the high-strength conductors 180. The multi-device housing 474 contains the electronic control subassembly 312 and all hardware for establishing PLC with the camera 124 and the EM sensor 324, among other possible instruments or sensors. The hardware can include multiple PLC encoders as part of a downhole module of a multi-device borehole monitoring system, the downhole module being connected to an uphole module as described above and illustrated in FIG. 2.

FIG. 19 illustrates yet another embodiment of an adapter assembly 560 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 560 can be similar to the adapter assembly 360 as shown in FIG. 11, including the camera 124 and the EM sensor 324, among other possible instruments or sensor as noted above. However, PLC transmission can use a combination of a single tracer wire 120 alongside the utility line product 164, and an additional electrical connection such as a wire 520 extending, with slack so as not to bear the pullback loads, through or alongside the linkage 184 to the camera housing 174. The wire 520 can be a wireline that extends within the drill string to the drill head 104 for locating and/or steering the drill head 104, or alternately the wire 520 can be a separate wire coupled to the internal wireline. In both cases, the wire 520 is referred to as drill string wire, and the drill head 104 includes an exit port for connection of the drill string wire with the adapter assembly 560. Thus, the camera housing 174 may have an end cap configured for the connection or passage of the drill string wire 520 to an interior thereof, similar to the second end cap 192 that is configured to connect with the tracer wires 120. As illustrated schematically in FIG. 19, the PLC power is divided such that the positive line comes to the adapter assembly 560 from one end (e.g., exit pit side), and the ground line comes to the adapter assembly 560 from the opposite end (e.g., the HDD or entry pit side). Nonetheless, these two separate power lines provide the means for PLC to/from both the camera 124 and the EM sensor 324, among other instruments or sensors. Thus, only half as much tracer wire is needed as compared to preceding embodiments, although the tracer wire that is used is used both during and after installation. As a side-effect of this configuration, one of the high-strength conductors 180 between the EM sensor housing 308 and the product connection portion 178 is not in fact utilized as a conductor for PLC. In yet another construction, the drill string wire 520 is one of two drill string wires that provide the PLC communication to the downhole instruments/sensors.

FIG. 20 illustrates yet another embodiment of an adapter assembly 660 for a downhole portion of a borehole monitoring system connected between the drill head 104 and the utility line 164 being installed. This embodiment is a variation of the embodiment of FIG. 19 that provides both the positive and ground conductors for the PLC to the downhole device(s) via multiple drill string wires 620 (e.g., multiple conductor wires within a cable). As such, the tracer wire(s) 120 is passive during installation of the utility line product 164 and only used post-installation to trace the location of the buried utility line. Due to this configuration, the high-strength conductors 180 between the product connection portion 178 and the EM sensor housing 308 are not in fact utilized as conductors for PLC, nor is PLC transmission conducted through the product connection portion 178. As such, these high-strength conductors 180 may be coupled with simplified connections, and in some constructions, need not even be provided as isolated conductors.

FIG. 21 illustrates yet another embodiment of an adapter assembly 760 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 760 can be similar to the adapter assembly 360 as shown in FIG. 11, including the camera 124 and the EM sensor 324, among other possible instruments or sensor as noted above. However, PLC transmission can use a combination of a single tracer wire 120 alongside the utility line product 164, and the utility line product itself (e.g., a conductive metallic utility line product). Thus, two tracer wires are not required. A portion of the product connection portion 178 is configured to establish an isolated conductive path between the utility line product 164 and one of the high-strength conductors 180 (i.e., the one not connected to the tracer wire 120).

FIG. 22 illustrates yet another embodiment of an adapter assembly 860 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 860 can include a housing 308A containing the EM sensor 324. The housing 308A may provide product connection, or another housing for product connection may be provided. The adapter assembly 860 includes only the EM sensor 324 for downhole sensing. As such, crossbore detection may be provided (e.g., through PLC as described above) solely by EM sensing—without any camera.

FIG. 23 illustrates yet another embodiment of an adapter assembly 960 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 960 can include a housing 308A containing the EM sensor 324. The housing 308A may provide product connection, or another housing for product connection may be provided. The adapter assembly 960 includes no camera, but may include (in the same housing 308A or another housing) at least one additional sensor that communicates through PLC, such as a strain gauge 340 and/or pressure transducer 350. The pressure transducer 350 may be exposed to borehole pressure (i.e., outside the housing 308A), and in some constructions may be utilized in crossbore detection. In particular, "wet" drilling techniques utilize pressurized drilling mud in the borehole, and a pressure drop at a particular location may indicate a void such as a crossbore. Additional details regarding the packaging and/or data usage of the pressure transducer 350 can be found in U.S. Pat. No. 9,664,027 assigned to Merlin Technology Inc., the entire contents of which are incorporated by reference. As such, crossbore detection may be provided (e.g., through PLC as described above) without any camera, whether through the EM sensor 324, the pressure transducer 340, or both. The strain gauge 340 (and other optional instruments such as a temperature sensor) may be operated during pullback, either in conjunction with crossbore monitoring/detection or for purposes unrelated to crossbore detection.

Figure 24:
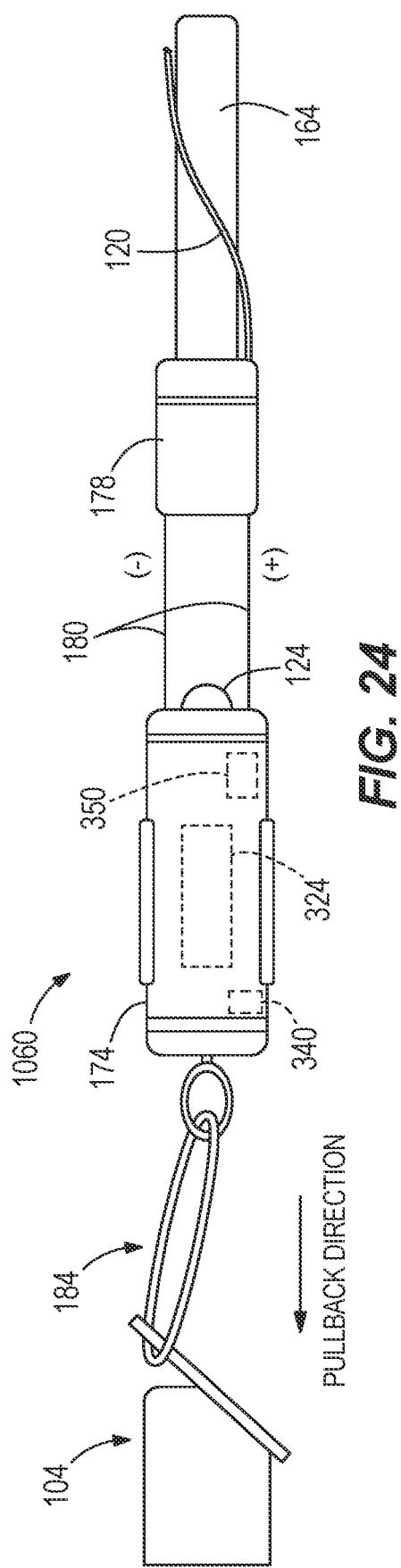
FIG. 24 is a schematic view of a downhole portion of a monitoring system, according to another embodiment of the present disclosure, in which a camera is provided along with an electromagnetic sensor and at least one additional sensor, such as a strain gauge and/or pressure transducer.

FIG. 24 illustrates yet another embodiment of an adapter assembly 1060 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 1060 can include a housing 174 containing the camera 124 and the EM sensor 324, along with at least one additional sensor that communicates through PLC, for example a strain gauge 340 and/or pressure transducer 350, as described in detail with respect to FIG. 23.

In a system having the setup as shown in FIG. 24, the EM sensor 324 can provide a preliminary warning, so that an operator is notified to more closely observe the data supplied from the camera 124. While boring, if the EM sensor 324 generates a warning at the time the housing 174 of the adapter assembly 1060 passes through something, that area becomes visible to the camera 124 just shortly thereafter. The housing 178 in this instance provides a consistent reference visible to the camera 124 to help in understanding the image.

Figure 25:
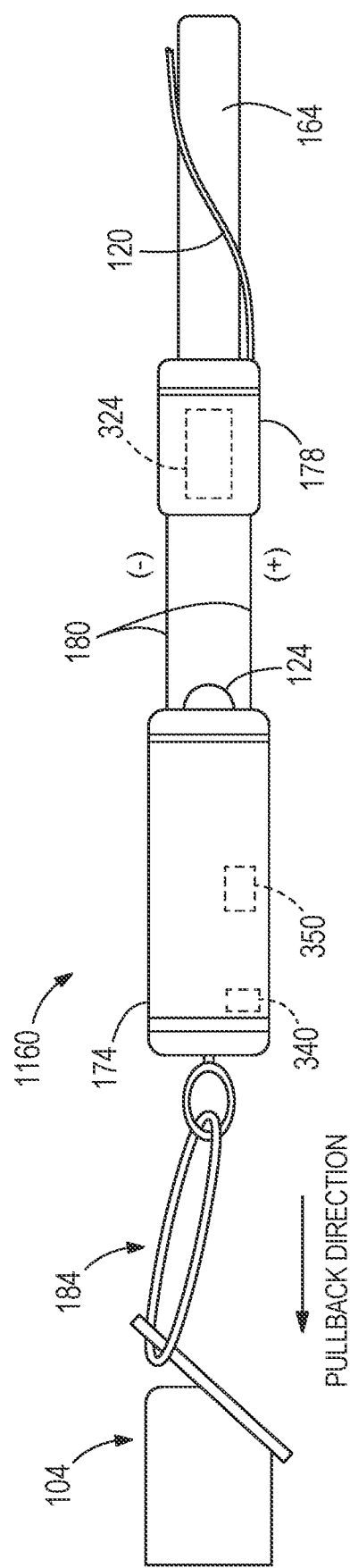
FIG. 25 is a schematic view of a downhole portion of a monitoring system, according to another embodiment of the present disclosure, in which a camera is provided along with at least one additional sensor, such as a strain gauge and/or pressure transducer.

FIG. 25 illustrates yet another embodiment of an adapter assembly 1160 for a downhole portion of a borehole monitoring system connected between the drill head 104 and the utility line 164 being installed. Unless otherwise noted, details of the components and method(s) of operation conform to the description of the preceding embodiment(s), and like reference numbers are used for like parts. In particular, the adapter assembly 1160 can include a housing 174 containing the camera 124, along with at least one additional sensor that communicates through PLC, for example a strain gauge 340 and/or pressure transducer 350, which may or may not be configured for crossbore detection. The adapter assembly housing 174 does not include an EM sensor. However, the EM sensor 324 can be provided in a separate housing (e.g., the product connection housing 178 as illustrated) to operate for borehole observation according to the preceding description. As illustrated in FIG. 25, this embodiment can provide a system in which the camera 124 is able to validate the bore hole condition at the EM sensor 324 since the camera in the housing 174 is able to see the housing 178 where the EM sensor 324 is located in the adapter assembly 1160. Thus, the camera 124 is able to validate the data generated by the EM sensor 324.

Changes may be made in the above methods and systems without departing from the scope hereof. Also, aspects of various embodiments may be combined unless expressly prohibited. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An adapter assembly for connection between a drill head of a horizontal directional drilling system and a utility line, the adapter assembly comprising:
   a central housing body defining an interior space;
   a first end cap secured to a first end of the central housing body;
   a second end cap secured to a second end of the central housing body and configured to attach to the utility line;

an electromagnetic (EM) sensor, including an antenna arrangement configured to emit and receive EM signals, provided within the interior space of the central housing body; and a connection structure at the first end cap configured to attach to the drill head for pullback, wherein the central housing body is at least partially transmissive to the EM signals emitted and received by the EM sensor, wherein the EM sensor is configured to receive electrical power and transmit data via wiring connected through at least one of the first and second end caps.

2. The adapter assembly of claim 1, further comprising a camera facing outward from the second end cap.

3. The adapter assembly of claim 1, wherein the central housing body is cylindrical-shaped.

4. The adapter assembly of claim 1, wherein the first and second end caps have threaded portions and are secured to the central housing body, respectively, via first and second threaded adapters.

5. The adapter assembly of claim 1, wherein the first and second end caps are anodized aluminum.

6. The adapter assembly of claim 1, wherein the second end cap is configured to attach to the utility line directly.

7. The adapter assembly of claim 1, wherein the second end cap is configured to attach to the utility line indirectly through a product attachment housing of the adapter assembly, wherein the second end cap and the product attachment housing are connected through a pair of wire ropes.

8. The adapter assembly of claim 1, further comprising an electrical control subassembly provided within the central housing body, the electrical control subassembly including a downhole power line communication (PLC) encoder and a signal processor circuit connected to the antenna arrangement.

9. The adapter assembly of claim 8, wherein the antenna arrangement includes a first antenna portion and a second antenna portion, and the first antenna portion is provided between the electrical control subassembly and the second antenna portion, wherein the wiring connects the second antenna portion to the electrical control subassembly, and the wiring extends through the first antenna portion.

10. The adapter assembly of claim 1, wherein the central housing body is entirely transmissive to the EM signals emitted and received by the EM sensor.

11. The adapter assembly of claim 1, wherein the central housing body includes antenna windows transmissive to the EM signals emitted and received by the EM sensor.

12. The adapter assembly of claim 1, wherein the wiring includes internal conductors within the central housing body, external conductors outside the central housing body, and a connector establishing electrical contact between the internal and external conductors, wherein the connector is received in a corresponding cavity formed in the second end cap.

13. The adapter assembly of claim 12, wherein the internal conductors are bonded to the connector to form a sealed connection.

14. A horizontal directional drilling system comprising:
a horizontal directional drilling machine;
a drill string terminating at a drill head and configured to be driven by the horizontal directional drilling machine to create an underground borehole extending at least partially horizontally between an entry point and an exit point;
an electromagnetic (EM) sensor, including an antenna arrangement, provided within a sensor housing coupled to the drill string; and
a product connection housing having a portion configured to secure a utility line for installation into the borehole during pullback of the drill string toward the entry point,
wherein the product connection housing is coupled to the sensor housing through a pair of flexible high-strength conductors, and
wherein the pair of flexible high-strength conductors are configured as load-bearing members to carry pullback loads between the sensor housing and the product connection housing.

15. The horizontal directional drilling system of claim 14, wherein the product connection housing includes a body and two end caps secured at opposite ends thereof, wherein a first one of the two end caps establishes mechanical connections with the pair of flexible high-strength conductors and a second one of the two end caps provides the portion configured to secure the utility line.

16. The horizontal directional drilling system of claim 14, wherein the sensor housing includes a cylindrical central housing body, a first end cap, and a second end cap, and wherein the central housing body is at least partially transmissive to EM signals emitted and received by the EM sensor.

17. The horizontal directional drilling system of claim 14, wherein the pair of flexible high-strength conductors are stainless steel aircraft cable.

18. The horizontal directional drilling system of claim 14, wherein the pair of flexible high-strength conductors are connected to an uphole power line communication (PLC) module for simultaneous half-duplex transmission of data from the electromagnetic sensor and power delivery from a power supply to the electromagnetic sensor.

19. The horizontal directional drilling system of claim 14, further comprising an uphole module configured to receive data from the EM sensor, wherein the uphole module is connected to the EM sensor for transmission of the data through the pair of flexible high-strength conductors, through internal non-load-bearing conductors within the product connection housing, and through additional conductors extending along the utility line.

20. The horizontal directional drilling system of claim 14, wherein the antenna arrangement of the EM sensor includes an electrical control subassembly, a first antenna portion, and a second antenna portion, and wherein wiring that connects the second antenna portion to the electrical control subassembly extends through the first antenna portion.

* * * * *